(12) United States Patent
Olden et al.

(10) Patent No.: US 11,876,796 B2
(45) Date of Patent: Jan. 16, 2024

(54) SYSTEMS, METHODS, AND STORAGE MEDIA FOR ABSTRACTION AND ENFORCEMENT IN AN IDENTITY INFRASTRUCTURE

(71) Applicant: Strata Identity, Inc., Niwot, CO (US)

(72) Inventors: Eric Olden, Niwot, CO (US); Christopher Marie, San Juan, PR (US); Carl Eric Leach, Piedmont, CA (US)

(73) Assignee: Strata Identity, Inc., Niwot, CO (US)

( * ) Notice: Subject to any disclaimer, the term of this patent is extended or adjusted under 35 U.S.C. 154(b) by 306 days.

(21) Appl. No.: 17/329,107

(22) Filed: May 24, 2021

(65) Prior Publication Data

US 2021/0385210 A1 Dec. 9, 2021

Related U.S. Application Data

(60) Provisional application No. 63/036,497, filed on Jun. 9, 2020.

(51) Int. Cl.
 *H04L 9/40* (2022.01)

(52) U.S. Cl.
 CPC ...... *H04L 63/0838* (2013.01); *H04L 63/0892* (2013.01); *H04L 63/102* (2013.01); *H04L 63/20* (2013.01)

(58) Field of Classification Search
 CPC .... H04L 63/0838; H04L 63/102; H04L 63/20
 See application file for complete search history.

(56) References Cited

U.S. PATENT DOCUMENTS

| | | | | |
|---|---|---|---|---|
| 8,418,238 | B2* | 4/2013 | Platt | H04L 63/20 |
| | | | | 726/8 |
| 9,729,539 | B1* | 8/2017 | Agrawal | H04L 63/0815 |
| 9,935,772 | B1* | 4/2018 | Madisetti | G06F 21/6209 |
| 2003/0074580 | A1* | 4/2003 | Knouse | H04L 63/0815 |
| | | | | 726/4 |
| 2008/0010288 | A1* | 1/2008 | Hinton | H04L 63/0815 |
| 2010/0088698 | A1* | 4/2010 | Krishnamurthy | H04L 63/10 |
| | | | | 718/1 |
| 2015/0052584 | A1* | 2/2015 | Rudraraju | H04L 63/102 |
| | | | | 726/4 |
| 2016/0080361 | A1* | 3/2016 | Sondhi | H04L 63/10 |
| | | | | 726/8 |

* cited by examiner

*Primary Examiner* — Matthew Smithers
*Assistant Examiner* — Shu Chun Gao
(74) *Attorney, Agent, or Firm* — Neugeboren O'Dowd PC

(57) ABSTRACT

Systems, methods, and storage media for abstraction and enforcement of protected resources in an identity infrastructure are disclosed. Exemplary implementations may: identify one or more protected resources for one or more identity domains of an identity infrastructure; receive, at the identity infrastructure, a dataflow pertaining to first identity data for a first identity domain; request the first identity session based at least in part on the first identity data; receive a request to access a first protected resource of the one or more protected resources; accept the first identity session by the first protected resource; and provide the first user access to the first protected resource.

18 Claims, 8 Drawing Sheets

SYSTEMS, METHODS, AND STORAGE MEDIA FOR ABSTRACTION AND ENFORCEMENT IN AN IDENTITY INFRASTRUCTURE

CLAIM OF PRIORITY UNDER 35 U.S.C. § 119

The present Application for Patent claims priority to U.S. Provisional Application No. 63/036,497 filed Jun. 9, 2020, and assigned to the assignee hereof, which is hereby expressly incorporated by reference herein.

FIELD OF THE DISCLOSURE

The present disclosure relates to systems, methods, and storage media for abstraction and enforcement in an identity infrastructure. More specifically, but not intended to limit the invention, the present invention relates to a system that allows for identity session abstraction and enforcement for protected resources across disparate identity domains.

BACKGROUND

An identity management system refers to computing platforms implementing a set of technologies used for controlling individual identities, their authentication, authorization, roles and privileges within or across the system and any enterprise boundaries associated with the system. These identity management systems are utilized to increase security within the system and enterprise boundaries, thereby increasing productivity, while decreasing cost, downtime, and repetitive tasks.

Types of functions provided by an identity management system include digital file access control, password management, provisioning of services within the network; enabling single sign-on (SSO), managing security tokens; and mitigating risk, among others. To provide these features, identity management systems frequently use identifiers comprising data used to identify a subject, credentials comprising evidence to support for claims about identities or parts thereof, and attributes comprising characteristics of a subject.

Since many entities utilize multiple third-party providers of cloud services, each with its own identity management system, there is increased fragmentation, layering, and dispersion of identity management within single organizations that utilize multiple services. This fragmentation, layering, and dispersion of identity management can create a cumbersome system to effectively administer.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

The present disclosure relates to a system that allows for identity session abstraction. This abstraction enables different identity management systems, referred to herein as identity domains, to provide, passively and without pre-configuration or internal knowledge, identity session information to different applications and resources, referred to herein as protected resources. In some cases, each protected resource may be associated with one identity domain. Some non-limiting examples of identity session information comprises information about the user, such as a user identifier or an opaque identifier, information about when and how the session was established (e.g., as the result of an authentication event), an indication of how long the identity session should last, and/or information pertaining to which protected resources the identity session is valid. An opaque identifier (or opaque user identifier) may refer to a type of identifier that does not reveal the user's identity and may comprise a random string or number, for instance.

In some embodiments, discovery agents may be placed within the identity infrastructure. In some examples, the discovery agents may be configured to act autonomously (e.g., with minimal input from a centralized server or administrator). These discovery agents may be configured to detect and assess information relevant to the overall status and structure of the identity infrastructure and report said data to administrators in human and machine-readable forms. Examples of relevant identity data include components of the identity infrastructure such as, but not limited to, identity domains, protected resources, and policy enforcement points. Examples may further include identity data and identity metadata such as, but not limited to, policies and rules (e.g., access policies and rules). For instance, examples further include identity data (e.g., individual user's data, including their credentials and attributes) and identity metadata (e.g., information about how identity is managed and coordinated, including password rules, authorization policies, network location of elements of an identity domain, etc.). Examples further include behaviors of the identity management systems. Examples further include network topologies. Examples further include dependencies between an identity system and a protected resource, such as a software application.

In some cases, one or more elements or agents of the system may be installed and placed as proxies and orchestrators within the flow of identity data (e.g., authentication and authorization requests, managing users, setting and reading user attributes) and identity metadata (e.g., setting, editing, and reading access policies, password rules, data locations, rules controlling user administration tasks and the hierarchy delegation of those tasks, rules for assigning user memberships in groups, roles, etc., and rules or policies to determine the assignment of accounts to users) of the existing system or identity infrastructure. Additional types of identity data may comprise security token registration and/or presentation, registration of user devices, user metrics used to inform authentication and/or authorization decisions, and session tokens. Such user metrics may include information related to the user at the time the user provides a request. For example, a user's current IP address, the configuration of a user device including any extensions used by a user, and behavioral data (e.g., how quickly a user types, implied velocity a user has traveled since a previous authentication attempt, which may be based upon the geographic locations of each authentication attempt) or risk data (how a user's current behavior compares to a similar cohort of users, how many times a user has attempted to authenticate over a period of time) may all comprise such user metrics. In some examples, decisions about when and how to authenticate or authorize access are based on these conditions, and so are not always "fixed" by attributes that are known about the user in advance.

One aspect of the present disclosure relates to a system configured for abstraction and enforcement in an identity infrastructure. The system may include one or more hardware processors configured by machine-readable instructions. The processor(s) may be configured to identify one or more protected resources for one or more identity domains of an identity infrastructure. Each of the one or more protected resources may be at least one of electronically, logistically, and communicatively coupled to one identity domain of the one or more identity domains. The processor(s) may be configured to receive, at the identity infrastructure, a dataflow pertaining to first identity data for a first identity domain. The first identity data may correspond to a first user and may include one or more of a first user identity, a first user credential, and a first user attribute. The dataflow may be linked to a first identity session. The processor(s) may be configured to request the first identity session based at least in part on user authentication data, where the user authentication data may include the first identity data. The first identity session may be associated with the first identity domain. The processor(s) may be configured to receive a request to access a first protected resource of the one or more protected resources. The processor(s) may be configured to accept the first identity session by the first protected resource. The accepting may include evaluating the first identity session and the first identity data. The processor(s) may enable the first user to access the first protected resource. The first user may be associated with the first identity domain. In some circumstances, the first protected resource may use the first identity session and/or the first identity data while deciding to allow one of complete access, restricted access, or no access to its resources.

Another aspect of the present disclosure relates to a method for abstraction and enforcement in an identity infrastructure. The method may include identifying one or more protected resources for one or more identity domains of an identity infrastructure. Each of the one or more protected resources may be at least one of electronically, logistically, and communicatively coupled to one identity domain of the one or more identity domains. The method may include receiving, at the identity infrastructure, a dataflow pertaining to first identity data for a first identity domain. The first identity data may correspond to a first user and may include one or more of a first user identity, a first user credential, and a first user attribute. The dataflow may be linked to a first identity session. The method may include requesting the first identity session based at least in part on user authentication data, where the user authentication data may include the first identity data. The first identity session may be associated with the first identity domain. The method may include receiving a request to access a first protected resource of the one or more protected resources. The method may include accepting the first identity session by the first protected resource. The accepting may include evaluating the first identity session and the first identity data. The method may include accessing the protected resource by the first user. The first user may be associated with the first identity domain. In some circumstances, the first protected resource may use the first identity session and/or the first identity data while deciding to allow one of complete access, restricted access, or no access to its resources.

Yet another aspect of the present disclosure relates to a non-transient computer-readable storage medium having instructions embodied thereon, the instructions being executable by one or more processors to perform a method for abstraction and enforcement in an identity infrastructure. The method may include identifying one or more protected resources for one or more identity domains of an identity infrastructure. Each of the one or more protected resources may be at least one of electronically, logistically, and communicatively coupled to one identity domain of the one or more identity domains. The method may include receiving, at the identity infrastructure, a dataflow pertaining to first identity data for a first identity domain. The first identity data may correspond to a first user and may include one or more of a first user identity, a first user credential, and a first user attribute. The dataflow may be linked to a first identity session. The method may include requesting the first identity session based at least in part on user authentication data, where the user authentication data may include the first identity data. The first identity session may be associated with the first identity domain. The method may include receiving a request to access a first protected resource of the one or more protected resources. The method may include accepting the first identity session by the first protected resource. The accepting may include evaluating the first identity session and the first identity data. The method may include accessing the protected resource by the first user, where the first user may be associated with the first identity domain. In some circumstances, the first protected resource may use the first identity session and/or the first identity data while deciding to allow one of complete access, restricted access, or no access to its resources.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
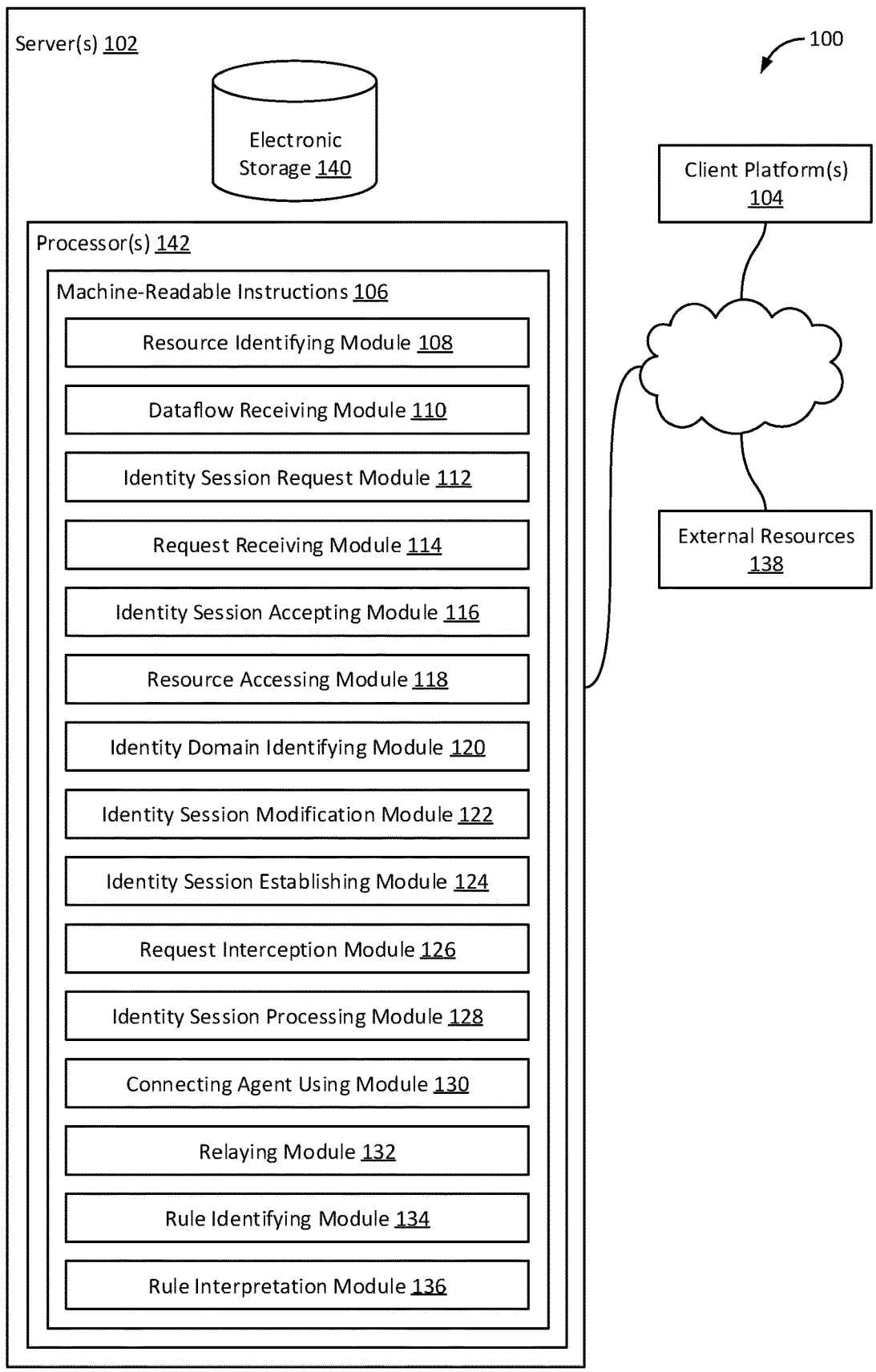
FIG. 1 illustrates a system configured for abstraction and enforcement in an identity infrastructure, in accordance with one or more implementations.

The words "for example" is used herein to mean "serving as an example, instance, or illustration." Any embodiment described herein as "for example" is not necessarily to be construed as preferred or advantageous over other embodiments.

The flowcharts and block diagrams in the following figures illustrate the architecture, functionality, and operation of possible implementations of devices, systems, methods, and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

For the purposes of this disclosure, identity data may refer to individual users' data, including their credentials and attributes. In some cases, identity data may comprise user authentication data. For instance, the identity data may include one or more of a user identity, a user credential, and a user attribute for one or more users of the one or more identity domains. Further, the identity metadata may include, but is not limited to, one or more of the enumeration of identity infrastructure elements and their network location and their configuration, identity policies such as authorization or authentication rules and mechanisms, and structure and contents of identity sessions (also referred to herein as "sessions" and a singular identity session as a "session"). An identity session may refer to an established set of identity data that enables a user to interact with a specific identity infrastructure, identity domain, protected resource, or any other item as described herein. Typically, an identity session is established by authenticating a user, for instance, by the user proving their identity through a mechanism such as password or biometrics (e.g., fingerprint, iris scan, voice recognition, etc.), and maintaining this session state (e.g., an authenticated state) for some established period of time or until the user logs out or their access rights are otherwise suspended. In some cases, a session may refer to a logical construct, for instance, based on a user's identity, that establishes persistence across file access and/or page views (e.g., HTTP pages). For example, HTTP is a stateless protocol, which means that when a user requests a particular webpage or resource from a server, and subsequently requests another webpage or resource from the same server, the server treats the user as a new "requestor" each time. In some examples, a session state refers to a mechanism that allows the server to remember the user by keeping a temporary record of the user. In some cases, each session may be assigned a unique identifier (or session ID) and this session ID may be used to store and retrieve a session state (or an application's working set of data) before and after each page view (e.g., HTTP page view). In some cases, the information associated with the session, such as the session ID, may be stored on the server from which the user is requesting the webpage or resource. Additionally or alternatively, the session ID may be stored on the computing or user device (e.g., laptop, smartphone, etc.) from which the user is accessing the resource. In some cases, a session may be established by authenticating a user and maintaining a session state for at least a threshold or an established period of time (e.g., 1 minute, 30 seconds, 5 minutes, etc.). In some cases, an identity session may also constitute a set of permissions granted to the user (e.g., for accessing resources, such as protected resources, in the identity infrastructure) and/or role information associated with the user. In some embodiments, the role information may be different from the user attribute. For instance, multiple users may be associated with the same or similar role information but may have different user attributes. In one example, users having similar designations or seniority levels in an organization (e.g., managers, managing directors, staff engineers, etc.) may be associated with the same or similar role information.

Identity metadata may be used herein to refer to information pertaining to how identity is managed and coordinated. Identity metadata may include password rules, such as, but not limited to: password length, a requirement that the password must contain one capital, one number, one symbol and/or cannot be the same as a previous password. Identity metadata may also include authorization policies, such as, but not limited to: user must be in the administrator group, a user must be logged in from a US-based IP address, and/or a user may only access resources during business hours (e.g., 9 AM to 5 PM). Additionally or alternatively, identity metadata may also be linked to network location (e.g., HTTP address, URL, FTP address, network address, such as an IP address, a MAC address, to name a few non-limiting examples) of elements of an identity domain.

For the purposes of this disclosure, the term "authentication" may refer to the process of verifying who a user is (i.e., to confirm that users are who they say they are), while the term "authorization" may refer to the process of verifying what a user has access to (e.g., access to a resource, such as an app, a document, a database, etc.).

An identity domain refers to a computing system for managing one or more of users and roles, integration standards, external identities, and secure application integration using, for instance, an authentication scheme (e.g., Single Sign-On (SSO)) and/or an authorization protocol (e.g., a set of rules that allows a third-party website or application to access a user's data without the user needing to share login credentials). In some examples, an identity domain controls the authentication and authorization of the users who can sign into a service (e.g., a cloud service), and what features they can access in relation to the service. For example, a cloud service (e.g., Database Cloud Service and Infrastructure as a Service (IaaS)) may be associated with an identity domain. Multiple services may be associated with a single identity domain to share user definitions and authentication rules, for instance. In some cases, users associated with an identity domain may be granted different levels of access (or authorization) to each service (e.g., cloud service) associated with the identity domain. For instance, a first user (e.g., an administrator) may be provided both read and write access, while another user (e.g., secretary) may only be provided read access. Thus, in some aspects, an identity domain is a self-contained realm with consistent identity data and identity metadata throughout. Some non-limiting examples of an identity domain include an Active Directory (AD) domain or an Okta account for a single company. It should be noted that other identity domains may be contemplated in different embodiments.

A discovery agent may refer to an entity (e.g., autonomous or semi-autonomous software entity) that is capable of assessing identity information within an identity infrastructure. Examples of this information include identity data, identity metadata, contents of identity sessions, protected resources (e.g., applications or apps), and the configuration and deployment of software and hardware entities (e.g., identity domain elements) that make up an identity domain. For the purposes of this disclosure, a protected resource comprises an element or application of the identity infrastructure to which access and control is allowed or restricted based at least in part on identity data.

An autonomous or semi-autonomous discovery agent may refer to the different actions the discovery agent undertakes, depending on the component within the identity domain the discovery agent is interacting with. For example, a discovery agent interacting with a web server may need to undertake different actions to understand the identity data associated with the web server as compared to the actions undertaken by a discovery agent deployed to interact with an identity data store. Understanding the collection of unique identity data or metadata utilized by each of these autonomously operating components (web server, data store) may be required to build a complete picture of the distributed components and data of an identity domain.

In some cases, one or more connecting agents (e.g., module 328 in FIG. 3A) or other proxy agents or elements may communicate identity data and/or identity metadata across identity domain boundaries (i.e., between disparate identity domains). Communication across identity domain boundaries may be facilitated by the transformation of the data between different formats (e.g., Kerberos, OAuth/OpenID Connect, Username/Password, Header-based, HTTP Basic Authentication, HTTP Digest Authentication, and Cookie-based, to name a few non-limiting examples). Additionally or alternatively, communication across identity domain boundaries may involve mapping of data elements for each domain (e.g., Domain 1 includes the elements street number, city, zip code; and Domain 2 includes street name, city, state, country, zone), communication of implicit/explicit policy information (e.g., Security Assertion Markup Language (SAML) communicating group membership, which may then be used to evaluate associated policies or geographic information about the originating request), and establishing and acting upon the trust mechanisms required for said communication. Trust between two or more entities may be established using a mechanism, such as Public Key Infrastructure (PKI). In other cases, trust may be established by implementing one or more standard specific configurations and/or by using authentication security and access controls mandated by an identity domain (e.g., a shared secret, API key, etc.). Some non-limiting examples of standards include OAuth, OpenID Connect, and SAML.

In some examples, an orchestrating agent may direct flow of identity data through the proposed system. In some cases, an orchestrating agent may work in conjunction with a connecting agent or may act as a connecting agent itself and may perform the said transformations and other connecting behaviors. In some embodiments, orchestrating agents may be installed and placed as proxies and orchestrators within the flow of identity data (e.g., authentication and authorization requests, managing users, setting and reading user attributes) and identity metadata (e.g., setting, editing, and reading access policies, password rules, data locations, rules controlling user administration tasks and the hierarchy delegation of those tasks, rules for assigning user memberships in groups, roles, etc., and rules or policies to determine the assignment of accounts to users) of the existing system or identity infrastructure.

Lastly, a protected resource may refer to an element or application of the identity infrastructure that is configured to assess or evaluate the identity data (e.g., information provided by a user to access the protected resource such as, but not limited to, a username, password, user attribute, unique identifier, unique pin, and biometric information such as, but not limited to a fingerprint, iris scan, and voice input, and other information known in the art) in order to make access and control decisions about its resources and/or data. In other words, a protected resource may be aware about the identity data needed to access it. In some circumstances, the protected resource may use the identity session and/or the identity data in deciding to allow access to its resources. In some embodiments, the protected resource may only allow restricted or partial access based on evaluating the identity data. As an example, a protected resource may expect a header (e.g., an authorization header, such as HTTP authorization header) or a cookie for access to the protected resource, while another protected resource may merely grant access upon a user arriving at that protected resource. In the case of a protected resource that grants access upon a user arriving at the resource, the protected resource may assume that the user has passed some check, such as authentication and/or authorization, prior to arriving at the protected resource. In such cases, the protected resource may not explicitly check for a header, cookie, certificate, token, etc., and may instead take the fact that the user reached the protected resource in the first place as evidence of protection. Thus, each protected resource may be aware of the mechanism by which it may be provided an identity session by its associated identity domain. In some aspects, the protected resources are coupled to the identity domain based on their reliance on identity session(s) and their particular formats and security constraints (i.e., identity data and/or identity metadata formats and constraints).

In some cases, the header/cookie may be passed in a token, such as an authentication token or an access token. In some cases, the authentication token may be generated and assigned to a user once the user is authenticated. Further, a certificate (e.g., a Public Key Infrastructure (PKI) certificate, such as a Secure Socket Layer (SSL) certificate) linked to the authentication token and representing a valid identity session may be issued to the user. In some cases, the certificate may be issued by a third party, such as a Certification Authority (CA) and may include the user's public key, a name, and any other applicable information. The certificate may serve as an attestation by the CA that the user is who they claim to be. For instance, the CA may sign a data structure that contains the user's public key and name, thus binding the user's public key to their name. Further, the certificate may be encrypted by the CA. The CA may also be linked to a private key and a public key, and may encrypt the certificate with a combination of the public and private keys associated with the CA. Any entity (e.g., protected resource, another user, another identity domain, etc.) with access to the CA's public key may verify the certificate (i.e., that the certificate is issued by a trusted CA) and/or the claim made in the certificate (i.e., the user is associated with the user's public key). The user may utilize this certificate for interactions with the protected resource, for instance. In some cases, authorization may comprise using attribute information associated with the token issued to the user during authentication and comparing said information to access control rules for the protected resource. If the rule permits the user to access the protected resource, the authorization is successful, and the user is granted access to the protected resource. In some other cases, access tokens may be utilized, for instance, if an identity domain or protected resource does not support the use of certificates and authentication tokens. In such cases, an access token may be issued by a server, such as an authorization server once the user identity data, access control rules, etc., is verified. In other words, the access token may serve as a proof that the user is authorized for access. This access token may be sent in an authorization header, such as an HTTP authorization header, and may be used to establish user identity and authorization. In some cases, the protected resource or identity domain may validate the token, for instance, via a call to one or more of the authentication and authorization server, or using a public key corresponding to a private key with which the authentication and/or authorization server signed the access token. Alternatively, in some circumstances, anyone (e.g., authorized user, rogue user) holding the access token may gain access to the protected resource. To alleviate such issues, communication of the access token may be secured via Transport Layer Security (TLS). Centralized validation of access tokens may also mitigate the chances of a rogue user gaining access to a protected resource (i.e., man in the middle attack). Some non-limiting examples of tokens (e.g., access tokens, authentication tokens) may comprise bearer tokens, hash-based authentication code (HMAC) tokens, and RSA-SHA1 tokens using RSA private/public keypairs. In some cases, a token may comprise one or more of unique string values, hashed values, a cryptographic hash function and a secret cryptographic key, attributes information, etc., issued by a server, such as an authentication server.

The identity infrastructure may include one or more identity domains and one or more identity infrastructure elements. The one or more identity domains may further comprise one or more identity domain elements, where the one or more identity domain elements may comprise hardware (e.g., servers, computing devices or platforms, etc.), software (e.g., a cloud service), or a combination thereof. By way of non-limiting example, the one or more infrastructure elements installed in the identity infrastructure may include one or more of servers, routers, identity stores comprising one or more databases of authentication information, policy enforcement points (PEPs) for enforcing authorization rules (e.g., shown as access system 523 in FIG. 5), authentication points for determining user identity (e.g., shown as authenticate system 521 in FIG. 5), proxy devices, policy decision points (PDPs) for evaluating authorization rules based at least in part on identity session attributes, and protected resources (e.g., applications or apps). An identity infrastructure may comprise at least one PDP and one or more PEPs. In some examples, each PEP may be co-located with an app or protected resource, while the PDP may be centralized and may communicate with a plurality of PEPs. According to aspects of this disclosure, the connecting agent may assume the responsibilities of either or both of the PDPs and PEPs. A PDP may comprise a system entity or component of a policy-based access control system within an identity domain configured to make authorization decisions for itself or alternatively, for other system entities that request such decisions. For instance, a PDP may be configured to determine whether or not to authorize a user's request based on available information (e.g., attributes, such as identity session attributes) and/or applicable security policies. In some cases, a PDP may examine a request to access a resource and compare said request to the policy that applies to requests for accessing that resource (i.e., to determine whether the requestor, such as a user, should be granted access). In some such cases, the connecting agent may communicate with one or more identity domain elements. For example, the connecting agent may communicate with a PDP in an identity domain, where the communication may comprise a request for a policy decision. The PDP may return a response to the connecting agent, where the response may comprise a Boolean value (e.g., yes/no, allow/deny, etc.). The connecting agent may grant or deny user access to the protected resource based on the response from the PDP. In another example, the connecting agent may request policy related information from the PDP, and utilize the information to decide whether or not to allow user access to the protected resource. In this way, the connecting agent may act as, or on behalf of, the PDP. Additionally or alternatively, the connecting agent may abstract one or more implementation details of an identity domain away from the protected resource or app. For instance, the connecting agent may enable an app associated with a first identity domain to work with (e.g., be accessed from) a second identity domain with no or minimal changes to the app. In some embodiments, the identity infrastructure may also comprise at least one authorizing agent, also referred to as an enforcing agent, for interpreting identity session information and evaluating access rules. In other words, the authorizing or enforcing agent may enforce access control for protected resources in the identity infrastructure. For example, an authorizing/enforcing agent may act as a PEP and enforce an access decision received (potentially, via a connecting agent) from a PDP. The request for the access decision may also be provided to the PDP from the PEP (potentially via a connecting agent). Alternatively, and as further described herein, the connecting agent may act as more than a proxy and may perform the functions of the PDP by receiving the policy from the PDP and making the determination of how to handle the access request; and/or the connecting agent may act as the PEP and enforce the policy. By communicating with various PEPs and PDPs in various identity domains, in such a manner, the connecting agent (and potentially authorizing/enforcing agent) may act as an orchestrating agent to control the access to protected resources in various identity domains. Authorizing or enforcing agents may be realized using hardware, firmware, software or a combination thereof. Some non-limiting examples of protected resources include applications or apps (e.g., mobile app, web-based app, etc.).

In some cases, one or more additional identity domains may be introduced into the identity infrastructure, where at least one protected resource has no prior knowledge and/or an established relationship with the additional identity domain(s). In such cases, a connecting agent may be introduced into the identity infrastructure. The connecting agent may be configured to modify an identity session of the introduced identity domain such that the modified identity session is compatible with the existing protected resource, which may allow the protected resource to use the modified identity session and its contained identity data without requiring changes or even knowledge of the additional identity domain. For example, an identity session comprising a cookie specific to one identity domain may arrive at the identity infrastructure. In this case, a connecting agent may transform the cookie into a set of headers representing the identity session in the form of a different identity domain. In other embodiments, alternate identity session modifications are also contemplated to ensure compatibility with another identity domain. For instance, an Application Programming Interface (API) may be utilized to transmit data from the identity session with one identity domain for use with another identity domain. Identity sessions may comprise identity information about the user (e.g., a user identifier, an opaque identifier, etc.) and/or information pertaining to one or more of: when and/or how the identity session was established (e.g., as the result of an authentication event), how long the identity session should last, for which protected resources the identity session is valid, etc. Other types of information described herein may be included in the identity session. Since, in some cases, the identity session may be customized; for instance, the format and contents may be formatted, encoded, or encrypted in a manner specific to a particular identity domain, using connecting agents to transform the cookie or access the API associated with the identity session enables identity data and metadata transmission between identity domains. It should be noted that identity session information may be customized and/or the use of connecting agents may be implemented to decrease the likelihood of an application or protected resource in a one identity domain from consuming an identity session received from another, different identity domain.

Furthermore, the connecting agent may be deployed such that requests to access a protected resource may not reach the protected resource without the identity session passing through the connecting agent. In some cases, the connecting agent may intercept or proxy all requests to the protected resource (e.g., requests originating in the identity domain comprising the protected resource, requests originating in a different identity domain than the protected resource). Such a deployment may allow the connecting agent to make appropriate changes required for the identity session to be accepted and recognized by the protected resource. In some embodiments, the protected resource may request the connecting agent to process one or more of the identity session and the identity data. For instance, the protected resource may request the connecting agent process the identity session and/or identity data when the protected resource receives a request to access its resources. For instance, following receiving a request for access to its resources and/or data, the protected resource may request session information from the connecting agent. In some embodiments, the identity session and identity data may be associated with the session information. It should be noted, however, that such processing does not necessarily imply reconfiguration of the type or format of the identity session, or knowledge by the protected resource in any change between identity domains. In some embodiments, each connecting agent may manage multiple identity domains and an associated mix of identity session formats and identity data contained therein. Further, connecting agents may also manage trust relationships of multiple identity domains and their associated protected resources. A trust relationship refers to a logical link established between two entities (e.g., a user and an identity domain, two identity domains, etc.), where one of the entities may be referred to as a trusting domain (e.g., a first identity domain) while the other may be referred to as a trusted domain (e.g., a second identity domain). When a trust relationship is in place, the trusting domain may honor, for instance, a login authentication associated with the trusted domain.

In some circumstances, trust relationships may be necessary for identity sessions to be accepted by the protected resource. Trust relationships may be a way to establish the validity of identity sessions and prevent spoofing of a session. In some cases, trust relationships may be established via a signature generated from a private key and validated using an associated public key. Public key cryptography (also known as asymmetric cryptography) refers to an encryption technique where two parties (e.g., a user and an identity domain, a user and a protected resource) may each be assigned two keys—a public key and a private key. Numerous cryptographic tools and modules exist for generating public/private key pairs. One non-limiting example of such a tool is OpenSSL provided by TheOpenSSL Project. OpenSSL is an open-source command line tool that is used for TLS and Secure Socket Layer (SSL) protocols, and may be used to generate public/private keys, install SSL/TLS certificates, and identity certificate information. Other types of commercial and/or open-source tools for generating public and private keys are contemplated in different embodiments. In some cases, the two keys for a respective party may be connected and may comprise two large prime numbers (e.g., 100 digits long, 150 digits long, etc.) with certain mathematical properties. For instance, two random n-bit (e.g., 512 bit, 1024 bit, etc.) prime numbers may be generated and multiplied together to create a modulus (N), where the value N is part of the public and private key. The public key may be shareable and may allow a receiving entity to receive messages from other entities. Further, the receiving entity may decrypt the message or dataflow using their private key. In such cases, a receiving entity may decode a message or dataflow encoded by a transmitting entity (i.e., using the receiving entity's public key) by using their private key (i.e., the receiving entity's private key). In some cases, a user may be authenticated using their login credentials and a trusted third party (e.g., a Certification Authority (CA)) may prove a link between the public key of the user and the user's identity. For instance, the CA may be associated with a public key and a private key and may sign a certificate using their private key. The identity domain or protected resource may use the public key associated with the CA to determine the user's public key (e.g., embedded within the certificate) and verify the user (i.e., confirm the user's identity by verifying who they say they are). In some cases, any entity (e.g., protected resource, another user, etc.) with the public key associated with the CA may decrypt the certificate to identify the user's public key.

In some cases, public/private key pairs may also be used to decrypt and verify assertions between different identity domain and/or identity infrastructure elements. Each receiving entity possessing a public key associated with a transmitting entity may be able to read (e.g., decrypt) a message that has been signed using a corresponding private key of the transmitting entity and confirm that the original contents of the message have not been altered, for instance. Or, in one non-limiting example, an identity domain element may use its private key to sign a cookie associated with an identity session. In such cases, one or more protected resources or applications that trust and rely on the cookie to grant user access to the protected resource may utilize the public key in the identity session to decrypt and verify the signature, thereby enabling access to the protected resource.

In other cases, trust relationships may involve Transport Layer Security (TLS) combined with a Domain Name System (DNS) to confirm that traffic is routed to the expected element and not subject to interception by a rogue party (e.g., Man-in-the-middle attack). As an example, two servers may connect together over a network and communicate with each other, where their communications may be secured using TLS. In some cases, TLS may involve the use of a specific protocol to enable the servers to establish their identity with each other. Similarly, communication(s) between an identity domain, enforcing agent, and/or protected resource may be secured using TLS.

As described above, identity domains (i.e., both original and subsequent identity domains) may have divergent abilities to interpret and enforce identity metadata. For example, an original identity domain may support an authorization rule that is inexpressible/unsupported in other identity domains. In such cases, the identity infrastructure or the system may be configured with connecting or orchestrating agents that allow for the interpretation and enforcement of these authorization rules across disparate identity domains. In one example, administrators of an Active Directory Identity Domain may be able to generate policy rules stating nobody may log in after 9 PM. However, an Okta Identity Domain may not support expressing or enforcing time-based rules. In this case, the connecting or orchestrating agent may interpret and enforce the time-based rules in the Okta Identity Domain.

For the purposes of this disclosure, the term "abstraction" may refer to the process of integrating an entity (e.g., a system) with one or more cloud platforms and/or identity systems, which may allow protected resources or apps to be decoupled from identity. Further, the term "enforcement" may refer to the process of applying rules (authentication and/or authorization rules), policies, etc., before users are allowed to gain access to applications through a corresponding identity system. In some cases, session abstraction may comprise creating composite identity profiles from multiple identity systems (or identity domains) and/or enabling a central policy configuration (e.g., for access policies) for the different identity domains associated with the identity infrastructure.

FIG. 1 illustrates a system 100 configured for abstraction and enforcement in an identity infrastructure, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms 104 via server(s) 102 and/or according to a peer-to-peer architecture and/or other architectures. Users may access system 100 via client computing platform(s) 104. In some implementations, server(s) 102, client computing platform(s) 104, and/or external resources 138 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 138 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 138 may include sources of information outside of system 100, external entities participating with system 100, and/or other resources. In some implementations, some or all of the functionality attributed herein to external resources 138 may be provided by resources included in system 100.

Server(s) 102 may be configured by machine-readable instructions 106. Machine-readable instructions 106 may include one or more instruction modules. The instruction modules may include computer program modules. The instruction modules may include one or more of resource identifying module 108, dataflow receiving module 110, identity session request module 112, request receiving module 114, identity session accepting module 116, resource accessing module 118, identity domain identifying module 120, identity session modification module 122, identity session establishing module 124, request interception module 126, identity session processing module 128, agent using module 130, relaying module 132, rule identifying module 134, rule interpretation module 136, and/or other instruction modules.

Resource identifying module 108 may be configured to identify one or more protected resources for one or more identity domains of an identity infrastructure. Each of the one or more protected resources may be at least one of electronically, logistically, and communicatively coupled to one identity domain of the one or more identity domains. As described above, in some cases, each protected resource may be configured to be aware and knowledgeable about a respective identity domain and related trust information. Trust information comprises data asserted within that identity domain and/or for that identity session. In some cases, the resource identifying module 108 may be configured to work in conjunction with the at least one discovery agent element (e.g., shown as discovery agent element 305 in FIG. 3A) or receive identity infrastructure assessment information from the discovery agent element for identifying the one or more protected resources. Such identity infrastructure assessment information may be received upon assessment by the discovery agent, which may comprise one or more of detecting and reporting of identity data and identity metadata within the identity infrastructure for each identity domain, groups of identity domains, protected resources and groups of protected resources within and between domains. The identity infrastructure may include one or more identity domains and one or more identity infrastructure elements. The one or more identity domains may further comprise one or more identity domain elements, where the one or more identity domain elements may comprise hardware (e.g., servers, computing devices or platforms, etc.), software (e.g., a cloud service), or a combination thereof. The at least one discovery agent element may be installed on or adjacent to at least one of the one or more identity infrastructure elements. By way of non-limiting example, the one or more infrastructure elements installed in the identity infrastructure may include one or more of servers, routers, identity stores comprising one or more databases of authentication information, policy enforcement points for enforcing authorization rules (e.g., shown as access system 523 in FIG. 5), authentication points for determining user identity (e.g., shown as authenticate system 521 in FIG. 5), proxy devices, policy decision points for evaluating authorization rules based at least in part on identity session attributes, and the one or more protected resources (e.g., applications or apps).

In some examples, network traffic and identity traffic may pass through the identity infrastructure. Dataflow receiving module 110 may be configured to receive, at the identity infrastructure, a dataflow pertaining to first identity data for a first identity domain. By way of non-limiting example, the first identity data corresponding to a first user may include one or more of a first user identity, a first user credential, and a first user attribute. The dataflow may be linked to a first identity session. In some circumstances, the network traffic may include one or more of requests for identity data and identity metadata from the one or more infrastructure elements within the identity infrastructure. By way of non-limiting example, the identity data may include one or more of a user identity, a user credential, and a user attribute for one or more users of the one or more identity domains. By way of non-limiting example, the identity metadata may include, but is not limited to, one or more of: the enumeration of identity infrastructure elements and their network location and configuration, identity policies such as authorization or authentication rules and mechanisms, and structure and contents of identity sessions. In some cases, the one or more of the identity data and the identity metadata may include one or more data and metadata stored within the one or more infrastructure elements. In some examples, the discovery agent element may be configured to intercept and/or proxy networking traffic that represents assertions of identity data or identity metadata to protected resources by one or more other elements within the identity infrastructure. The discovery agent element may be configured to assess and report on the structure of the identity infrastructure based on such interceptions. In some cases, the discovery agent element may report at least one of the status and the structure of the identity infrastructure to one or more of an administrator and a centralized server (e.g., shown as system 300-*a* in FIG. 3A).

Dataflow receiving module 110 may be configured to receive, at the identity infrastructure, a second dataflow pertaining to at least a portion of the first identity data for a second identity domain. In some examples, the at least the portion of the first identity data may correspond to the first user and the second dataflow may be linked to a second identity session. In other cases, the second dataflow may only contain identity data and/or identity session information related to the second identity domain, and not the first identity domain. In other words, the second dataflow may only reference a user (or users) with no entry (i.e., relation or presence) in the first identity domain. In such cases, the system of the present disclosure may nonetheless alter (or modify) the second identity session such that it may be accepted by the protected resource associated with the first identity domain, as further described below.

As noted above, an identity session refers to an established set of identity data that represents a user interacting with the identity infrastructure. In some cases, a session may be established by authenticating a user (e.g., by a user proving their identity through a mechanism such as password or biometrics) and maintaining this session state (e.g., authenticated state) for some established period of time or until the user logs out or their access rights are otherwise suspended. In some examples, identity session request module 112 may be configured to request an identity session based at least in part on identity data or user authentication data, such as the first identity data associated with the first user, second identity data associated with a second user, etc. In some cases, the first identity session may be associated with the first identity domain and the second identity session may be associated with the second identity domain.

Request receiving module 114 may be configured to receive a request to access a first protected resource of the one or more protected resources.

Request receiving module 114 may be configured to receive a second request to access the first protected resource. The first protected resource may or may not be coupled to the second identity domain.

Identity session accepting module 116 may be configured to accept the first identity session by the first protected resource. In some examples, the accepting may include assessing or evaluating the first identity session and the first identity data. For instance, the first protected resource may use the first identity session and the first identity data while deciding to allow access (i.e., complete access, restricted or partial access, no access) to its data or resources. Identity session accepting module 116 may be configured to accept the modified second identity session by the first protected resource. The accepting may include evaluating or using the modified second identity session.

Resource accessing module 118 may be configured to access the protected resource by the first user, where the first user may be associated with the first identity domain. Resource accessing module 118 may be configured to enable one or more of the first user and a second user to access the protected resource. The second user may be further associated with the second identity domain.

Identity domain identifying module 120 may be configured to identify one or more other identity domains, such as a second identity domain, in the identity infrastructure. In some cases, the identity domain identifying module 120 may be configured to work in conjunction with the at least one discovery agent element.

Identity session modification module 122 may be configured to modify the second identity session for the second identity domain based at least in part on analyzing a compatibility of the second identity session with the first protected resource. The identity session modification module may also be configured to create a modified second identity session.

Identity session establishing module 124 may be configured to establish the modified second identity session based at least in part on the user authentication data (e.g., at least a portion of the first identity data associated with the second identity domain). The modified second identity session may be associated with the second identity domain.

Request interception module 126 may be configured to intercept, by a connecting agent of the identity infrastructure, the request to access the first protected resource before the request is received at the first protected resource. For instance, the connecting agent (e.g., shown as module 328 in FIG. 3A) may operate in a proxy mode, wherein it proxies user requests to access a protected resource (e.g., app 325 in FIG. 3A). The first protected resource may be at least one of electronically, logistically, and communicatively coupled to the first identity domain. Further, the first protected resource may not only be configured to be aware or knowledgeable about the first identity domain, but also trust information asserted within the first identity domain. In some examples, the connecting agent may include one or more connecting agents. As described above, in some embodiments, a connecting agent may receive a request for session information from the protected resource based in part on the protected resource receiving a request for access to its resources. In some examples, the protected resource or application may request one or more of authentication information (e.g., from authenticate system 521 in FIG. 5), authorization information (e.g., from access system 523 in FIG. 5), and/or session information prior to granting a user access to its resources. In such cases, rather than intercepting the user's request to access the protected resource, as is the case in the proxying mode, the connecting agent intercepts the requests from the protected resource to one or more identity domain elements (e.g., authenticate system, access system, etc.), identity infrastructure elements, etc. In one non-limiting example, the connecting agent may route the request to an identity domain and return the session information to the protected resource in a format expected by the protected resource. In some cases, the identity domain may or may not be associated with the protected resource. Further, the protected resource may or may not be aware of the identity domain to which the connecting agent routed the request.

Identity session processing module 128 may be configured to process one or more of the first identity session and the first identity data by the connecting agent. In some cases, processing the one or more of the first identity session and the first identity data by the connecting agent may be based in part on intercepting the request to access the first protected resource. In some embodiments, identity session processing module 128 may be configured to process one or more of the first identity session and the first identity data by the connecting agent, where the first identity session and the first identity data are associated with the session information. In some embodiments, the connecting agent may receive a request for session information from the first protected resource.

Connecting agent using module 130 (or simply, agent using module 130) may be configured to use the one or more connecting agents to manage at least a portion of the one or more identity domains, including at least the first identity domain. Additionally or alternatively, the agent using module 130 may be configured to the one or more connecting agents to manage a plurality of identity session formats and identity data, including at least a first identity session format associated with the first identity session, and the first identity data. It should be noted that, the system of the present disclosure may support management of a plurality of identity domains of the identity infrastructure by one or more connecting agents. In other words, a connecting agent may manage the identity for any mix or combination of identity domains. Furthermore, the identity domains managed by different connecting agents may overlap, in some embodiments.

Agent using module 130 may be configured to use the one or more connecting agents to manage one or more trust relationships between the one or more protected resources and respective identity domains. At least a portion of the one or more protected resources may be at least one of electronically, logistically and communicatively coupled to the one or more identity domains. At least one trust relationship of the one or more trust relationships may be based at least in part on a signature generated from a private key and validated using an associated public key or transport layer security (TLS) combined with a domain name system (DNS).

Relaying module 132 may be configured to use the one or more connecting agents to relay identity data and identity metadata across identity domain boundaries. The relaying may include one or more of transforming identity data and identity metadata between formats. Some non-limiting examples of formats may comprise identity session formats, formats related to identity data, user attributes, policies, and/or identity metadata. The relaying may include mapping of data elements for each identity domain of the one or more identity domains. In some cases, identity data, such as user attributes, policies, configurations, and/or identity sessions may be represented in more than one identity domain. For instance, two or more records (e.g., user profiles) for the same user may exist in multiple identity domains. Additionally or alternatively, a similar or substantially similar policy (e.g., access policy) may be defined in multiple identity domains. In some embodiments, declarative configuration may be used to determine the mapping of similar data from one identity domain to one or more other identity domains. As an example, declarative configuration may involve determining how to map an attribute (e.g., associated with a user's last name) called "lastName" in one identity domain to the same or similar attribute called "last_name" in another identity domain. In some other cases, the mapping of data elements between different identity domains may also help determine precedence and/or quality of data, for example, due to a mismatch between data element values in the different identity domains. In one non-limiting example, the mapping may explicitly define that a value from a first identity domain should take precedence over a value from a second identity domain. It should be noted that similar mappings and resolution of precedence may be applied to policies and other identity data configurations. Which domain data should take precedence is handled through the policies and/or configurations within the identity infrastructure. For example, the domain comprising a source of identity data may be identified in one identity infrastructure as always overwriting a target identity domain (i.e., the source takes precedence). More complex precedence determinations may be utilized.

In some embodiments, the relaying may also include communicating implicit and explicit policy information. For instance, a first identity domain may contain a policy that specifies, for a given protected resource, a user must authenticate, pass a second factor authentication challenge (e.g., multi-factor authentication), and hold membership in a certain organization unit or group. In this example, the relaying module 132 (or another module) may determine how a similar policy may be represented in a second identity domain (e.g., using the specific grammar and syntax of the second identity domain), and may relay the same to the second identity domain. In some other cases, the relaying may also include establishing trust mechanisms or relationships for the communication (e.g., using a signature generated from a private key and validated using an associated public key).

Rule identifying module 134 may be configured to identify one or more rules associated with identity metadata for a second identity domain before requesting the first identity session. By way of non-limiting example, the identity metadata may include one or more of a password rule, an authorization policy, and network locations of one or more identity domain elements for the second identity domain.

In some circumstances, a request for access to a protected resource of the first identity domain may only contain identity session information and identity data from a second identity domain. Furthermore, the protected resource (or its authorizing/enforcing agent) may not be able to apply access rules associated with the first identity domain. In some cases, the connecting agent may be configured to identify, interpret and enforce the access rules associated with the first identity domain, which may grant the user associated with the second domain equivalent access to the protected resource associated with the first domain. In some embodiments, a rule interpretation module 136 may be configured to interpret and enforce the one or more rules, such as access rules, for the first identity domain based at least in part on the identifying. In some embodiments, the rule interpretation module 136 may also be configured to enforce one or more access rules for accessing the first protected resource based at least in part on the interpreting. The one or more access rules may be associated with the first identity domain.

Server(s) 102 may include electronic storage 140, one or more processors 142, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 140 may comprise non-transitory storage media that electronically stores information. The electronic storage media of electronic storage 140 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 140 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 140 may include one or more virtual storage resources (e.g., cloud storage, a virtual private network, and/or other virtual storage resources). Electronic storage 140 may store software algorithms, information determined by processor(s) 142, information received from server(s) 102, information received from client computing platform(s) 104, and/or other information that enables server(s) 102 to function as described herein.

Processor(s) 142 may be configured to provide information processing capabilities in server(s) 102. As such, processor(s) 142 may include one or more of a digital processor, an analog processor, a digital circuit designed to process information, an analog circuit designed to process information, a state machine, and/or other mechanisms for electronically processing information. Although processor(s) 142 is shown in FIG. 1 as a single entity, this is for illustrative purposes only. In some implementations, processor(s) 142 may include a plurality of processing units. These processing units may be physically located within the same device, or processor(s) 142 may represent processing functionality of a plurality of devices operating in coordination. Processor(s) 142 may be configured to execute modules 108, 110, 112, 114, 116, 118, 120, 122, 124, 126, 128, 130, 132, 134, and/or 136, and/or other modules. Processor(s) 142 may be configured to execute modules 108, 110, 112, 114, 116, 118, 120, 122, 124, 126, 128, 130, 132, 134, and/or 136, and/or other modules by software; hardware; firmware; some combination of software, hardware, and/or firmware; and/or other mechanisms for configuring processing capabilities on processor(s) 142. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, 132, 134, and/or 136 are illustrated in FIG. 1 as being implemented within a single processing unit, in implementations in which processor(s) 142 includes multiple processing units, one or more of modules 108, 110, 112, 114, 116, 118, 120, 122, 124, 126, 128, 130, 132, 134, and/or 136 may be implemented remotely from the other modules. The description of the functionality provided by the different modules 108, 110, 112, 114, 116, 118, 120, 122, 124, 126, 128, 130, 132, 134, and/or 136 described below is for illustrative purposes, and is not intended to be limiting, as any of modules 108, 110, 112, 114, 116, 118, 120, 122, 124, 126, 128, 130, 132, 134, and/or 136 may provide more or less functionality than is described. For example, one or more of modules 108, 110, 112, 114, 116, 118, 120, 122, 124, 126, 128, 130, 132, 134, and/or 136 may be eliminated, and some or all of its functionality may be provided by other ones of modules 108, 110, 112, 114, 116, 118, 120, 122, 124, 126, 128, 130, 132, 134, and/or 136. As another example, processor(s) 142 may be configured to execute one or more additional modules that may perform some or all of the functionality attributed below to one of modules 108, 110, 112, 114, 116, 118, 120, 122, 124, 126, 128, 130, 132, 134, and/or 136.

Figure 2:
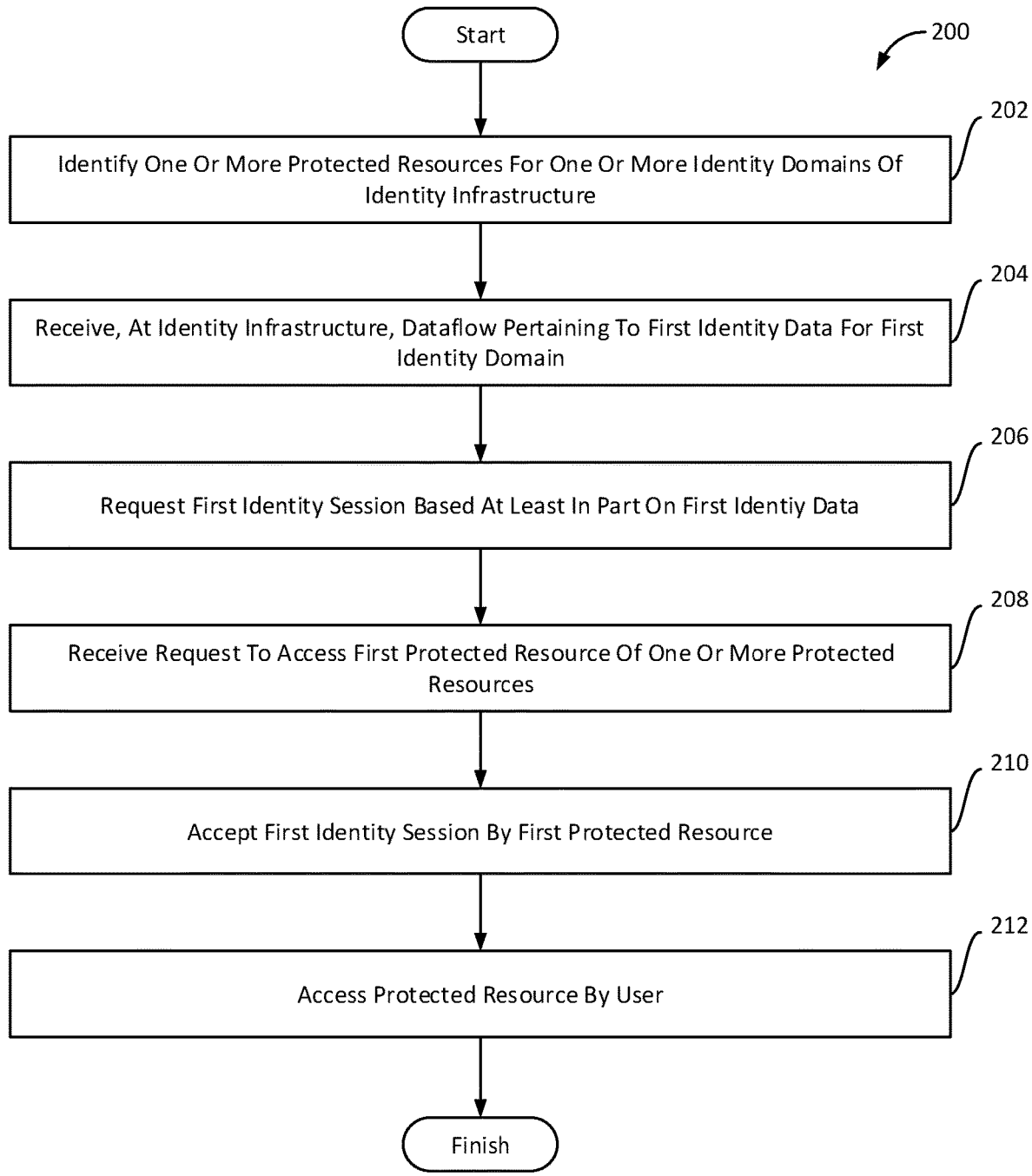
FIG. 2 illustrates a method for abstraction and enforcement in an identity infrastructure, in accordance with one or more implementations.

FIG. 2 illustrates a method 200 for abstraction and enforcement in an identity infrastructure, in accordance with one or more implementations. In some cases, method 200 may implement one or more aspects of FIG. 1. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

A first operation 202 may include identifying one or more protected resources for one or more identity domains of an identity infrastructure. Each of the one or more protected resources may be at least one of electronically, logistically, and communicatively coupled to one identity domain of the one or more identity domains. First operation 202 may be performed by one or more hardware processors configured by machine-readable instructions including a module that is the same as or similar to resource identifying module 108, in accordance with one or more implementations.

A second operation 204 may include receiving, at the identity infrastructure, a dataflow pertaining to first identity data for a first identity domain. In some cases, the first identity data may correspond to a first user, and may include one or more of a first user identity, a first user credential, and a first user attribute for the first user. The dataflow may be linked to a first identity session. Second operation 204 may be performed by one or more hardware processors configured by machine-readable instructions including a module that is the same as or similar to dataflow receiving module 110, in accordance with one or more implementations.

A third operation 206 may include requesting the first identity session based at least in part on the first identity data (also referred to as user authentication data). In some examples, the first identity session may be associated with the first identity domain. Third operation 206 may be performed by one or more hardware processors configured by machine-readable instructions including a module that is the same as or similar to identity session request module 112, in accordance with one or more implementations.

A fourth operation 208 may include receiving a request to access a first protected resource of the one or more protected resources. Fourth operation 208 may be performed by one or more hardware processors configured by machine-readable instructions including a module that is the same as or similar to request receiving module 114, in accordance with one or more implementations.

A fifth operation 210 may include accepting the first identity session by the first protected resource. The accepting may include assessing or using the first identity session and/or the first identity data. Fifth operation 210 may be performed by one or more hardware processors configured by machine-readable instructions including a module that is the same as or similar to identity session accepting module 116, in accordance with one or more implementations.

A sixth operation 212 may include accessing the protected resource by the first user. The first user may be associated with the first identity domain. Sixth operation 212 may be performed by one or more hardware processors configured by machine-readable instructions including a module that is the same as or similar to resource accessing module 118, in accordance with one or more implementations.

Figure 3A:
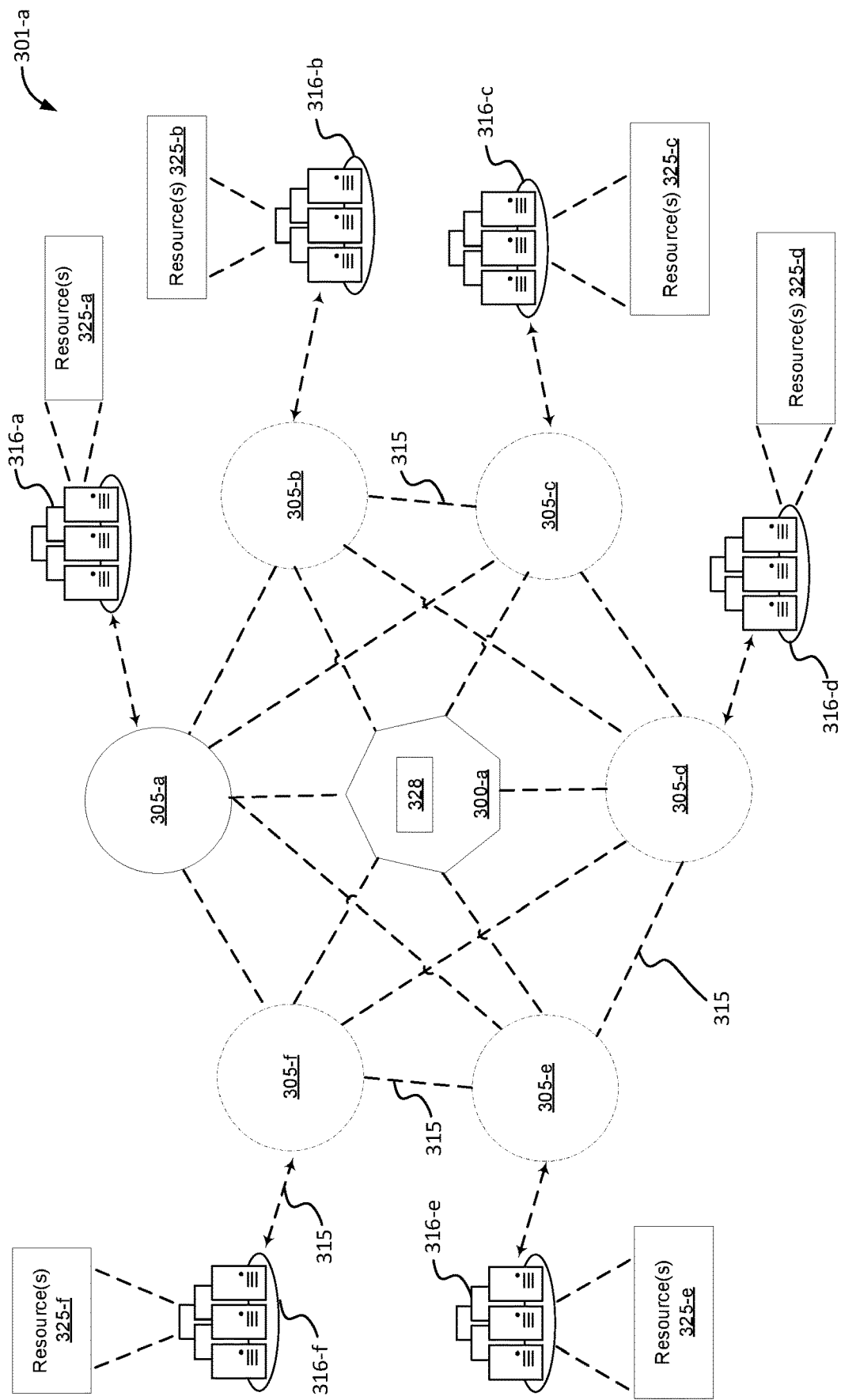
FIG. 3A illustrates a distributed identity management environment comprising the system of FIG. 1, according to an embodiment of the disclosure.

FIG. 3A illustrates identity infrastructure 301-a within a distributed identity management environment, according to an embodiment of the disclosure. In some cases, the identity infrastructure 301-a may comprise one or more identity infrastructure elements 316 and may be associated with one or more identity domains or identity management systems. For example, each of the one or more identity infrastructure elements 316 may be associated with one identity domain of the one or more identity domains. Alternatively, multiple identity infrastructure elements 316 may be associated with a single identity domain. In some examples, the identity infrastructure 301-a may be deployed by a single client organization or enterprise. In some cases, at least a portion of the identity infrastructure elements 316 may be associated with one or more cloud computing platforms. For instance, the client organization may utilize the cloud computing platforms for running applications ("apps") used by the client organization's workforce (e.g., a CRM app, such as SALESFORCE provided by Salesforce.com, Inc., of San Francisco, CA, an accounting app, project management app, an app or software used by their HR department, to name a few non-limiting examples) and/or the client organization's customers (e.g., a customer self-service portal used by customers of a wireless provider or internet-cable company).

In some cases, the distributed identity management environment may comprise a system 300-a configured for abstraction and enforcement in the identity infrastructure 301-a. System 300-a may be similar or substantially similar to the system 100 described in relation to FIG. 1. In some embodiments, the system 300-a may comprise a centralized server (not shown). Alternatively, the system 300-a may be implemented using a server (e.g., the system 300-a may be hosted on a server), where the server may be utilized for abstraction and/or enforcement in the identity infrastructure. In some other cases, the server or system 300-a may manage multiple distributed identity management environments, each distributed identity management environment associated with at least one enterprise or organization and comprising one or more identity infrastructure elements. For instance, the server (or system 300-a) may be located in the cloud (i.e., not exclusive to a single client) and may simultaneously discover, assess, and manage identity infrastructure elements across multiple distributed identity management environments via the cloud. Alternatively, the identity infrastructure and/or disparate identity domains (e.g., cloud-based, on-premises, etc.) for each client organization or enterprise may be assessed via an existing identity infrastructure element (e.g., identity infrastructure element 316-a, which may be an example of an on-premises Apache or Nginx server).

In some embodiments, protected resources (e.g., applications or apps) may be distributed across multiple cloud platforms. For instance, a company or organization may comprise first resources 325-a deployed on a first cloud platform, second resources 325-b deployed on a second cloud platform, third resources 325-c deployed on a third cloud platform, fourth resources 325-d deployed on a fourth cloud platform, fifth resources 325-e deployed on a fifth cloud platform, and sixth resources 325-f deployed on a sixth cloud platform. In some cases, each cloud platform may be associated with a unique identity infrastructure system and management system (e.g., unique identity domain). For instance, each cloud platform may be associated with a unique set of identity infrastructure elements 316. In some circumstances, each of the one or more identity infrastructure elements 316 may comprise varying configurations and/or behaviors. Some non-limiting examples of identity infrastructure elements 316 installed in the identity infrastructure include servers, routers, identity stores, policy enforcement points, authentication points, proxies or proxy devices, policy decision points, etc., further described in relation to the figures below. In some examples, the identity policies comprise at least one of authorization rules and mechanisms and authentication rules and mechanisms. Further, the identity data may be utilized to access and control the one or more protected resources.

In some cases, assessment of identity resources or identity infrastructure elements in an identity infrastructure may begin by the introduction of workers and/or proxies into the identity infrastructure. These workers and/or proxies may comprise discovery agents to assist in the detection and assessment of the identity information, such as identity data and identity metadata, stored within the identity infrastructure elements. In some cases, one or more discovery agents 305 may be installed within the identity infrastructure 301-a. In some examples, the discovery agents 305 may report information about the identity infrastructure to another agent or module, for instance, the resource identifying module 108 or the identity domain identifying module 120 previously described in relation to FIG. 1. Such information may comprise a list of identity infrastructure elements which includes network location (e.g., IP address), configuration information for the various identity infrastructure elements 316, information pertaining to how the infrastructure elements communicate with each other and/or other devices in the architecture, information pertaining to the types of authentication and authorization mechanisms supported (or required) by the infrastructure elements 316, and/or what metadata the infrastructure elements 316 use, such as authentication or authorization policies, password policies, etc.

As shown, a first discovery agent element 305-*a* may be installed on or near an identity infrastructure element 316-*a* (e.g., an Apache or NGINX server). In some examples, the system 300-*a* may comprise at least one module 328, which may be an example of a connecting agent, an identity session modification module (e.g., identity session modification module 122 in FIG. 1), an identity session establishing module (e.g., identity session establishing module 124 in FIG. 1), an identity session processing module (e.g., identity session processing module 128 in FIG. 1), etc. The system 300-*a* and the at least one module 328 may manage at least a portion of the one or more identity domains, manage a plurality of identity session formats and identity data, process identity sessions and/or identity data, and provide access to protected resources based at least in part on the processing, to name a few non-limiting examples. Additionally or alternatively, the system 300-*a* and the at least one module 328 may assess the identity infrastructure 301-*a* by the at least one discovery agent element 305-*a*. In some cases, additional discovery agent elements 305 (e.g., discovery agent element 305-*b*, 305-*c*, etc.) may be spawned. It should be noted that the dash-dot lines for the discovery agent elements 305-*b*, 305-*c*, 305-*d*, 305-*e*, and 305-*f* indicate that they are optional. While not shown, in some examples, one or more connecting agents may be installed at or near the discovery agent elements 305. Such a configuration may enable the connecting agent to intercept a request to access a protected resource before an identity infrastructure element or the protected resource receives the request to access the protected resource.

In some cases, assessing the identity infrastructure 301-*a* may comprise one or more of identifying the one or more infrastructure elements 316 within the identity infrastructure, intercepting network traffic in the identity infrastructure, assessing a status and structure of the identity infrastructure, detecting and assessing one or more configurations of the one or more infrastructure elements installed in the identity infrastructure, and/or detecting and assessing protected resources, such as resources 325, within the identity infrastructure. For example, after collecting data from the one or more discovery agents, the assessment module may determine which types of access had been granted on a resource, for which users, as the result of the evaluation of certain policies, and in conjunction with authentication by a particular identity domain. This evaluation may represent the "status" of the identity infrastructure. In some cases, the system 300-*a* may comprise a configuration detection module (e.g., shown as configuration detection module 372 in FIG. 3B), where the configuration detection module may detect and assess one or more configurations of the one or more infrastructure elements installed in the identity infrastructure based at least in part on the identifying the one or more infrastructure elements. By way of non-limiting example, the one or more configurations may include at least one of the identity data and metadata that may be stored within the identity infrastructure elements, information related to a flow of data associated with the one or more infrastructure elements, and behavior of the one or more identity infrastructure elements. As an example, if a user is attempting to access a protected resource, a request may be sent to a corresponding identity infrastructure element. If the request arrives without an identity session, the user may be redirected to a login page for a corresponding identity domain, where the user is prompted for login credentials (e.g., a user identity, a user credential, a user attribute, etc.). The login credentials may be received as a dataflow 315, where the dataflow 315 may be linked to an identity session. After the identity session is established, the user may be redirected to the protected resource. In some cases, establishing the identity session may comprise accepting the identity session by the protected resource, where the accepting comprise evaluating the identity session and/or identity data (e.g., login credentials). In this example, the discovery agent element 305-*a* may detect and assess the network and/or identity traffic as it is routed to the protected resource (e.g., resource 325-*a*), for instance, to identify the type of information a successful request contains, to identify how and where unsuccessful requests are routed, etc. A successful request may refer to a request where a user gains access to the protected resource. Contrastingly, an unsuccessful request may refer to a request where the user is denied access to the protected resource.

As noted above, the one or more infrastructure elements 316 installed in the identity infrastructure may include one or more of servers, routers, identity stores comprising one or more databases of authentication information, policy enforcement points for enforcing authorization rules, authentication points for determining user identity, proxy devices or proxies, policy decision points for evaluating authorization rules, and/or protected resources, to name a few non-limiting examples. In some cases, the discovery agent element 305-*a* may identify at least a portion of these identity infrastructure elements. For instance, in one non-limiting example, the discovery agent may identify that the infrastructure element 316-*a* comprises a server and an identity store, the infrastructure element 316-*b* comprises a policy enforcement point and a policy decision point, and the infrastructure element 316-*c* comprises an authentication point.

In some cases, each of the dashed lines may represent a data flow 315 (e.g., flow of network traffic). As used herein, the term "data flow" may refer to a path for data to move from different parts of the distributed identity management environment. For instance, data flow may refer to a path for data to move between different identity infrastructure elements 316, between different discovery agent elements 305, and/or between a discovery agent element 305 and the system 300-*a*, to name a few non-limiting examples. In some examples, a data flow may represent a single data element (e.g., username, date of birth, Social Security Number (SSN), etc.). Alternatively, a data flow may represent a set of data elements (i.e., a data structure). In some other cases, a data flow may be used to organize and persist self-service data (i.e., data may be transformed as part of the data flow). In some aspects, data flows may help reusability of the underlying data elements, for instance, between different identity infrastructure elements within the identity infrastructure.

In some cases, the one or more data flows 315 may pertain to identity data or identity metadata requests from the one or more infrastructure elements 316 within the identity infrastructure 301-*a*. In some cases, the at least one discovery agent element 305 (e.g., discovery agent element 305-*a*) may intercept first network traffic (e.g., a data flow 315) in the identity infrastructure, where the first network traffic may include one or more of requests for identity data and identity metadata from the one or more infrastructure elements 316. In some cases, the identity data and/or identity metadata may be stored within the one or more identity infrastructure elements. Returning to the example above, the discovery agent element 305-*a* may intercept network traffic, such as a request for identity data or identity metadata, between the infrastructure element 316-c (i.e., comprising an authentication point) and the infrastructure element 316-a (i.e., comprising a server and an identity store), for instance, for determining user identity.

Figure 3B:
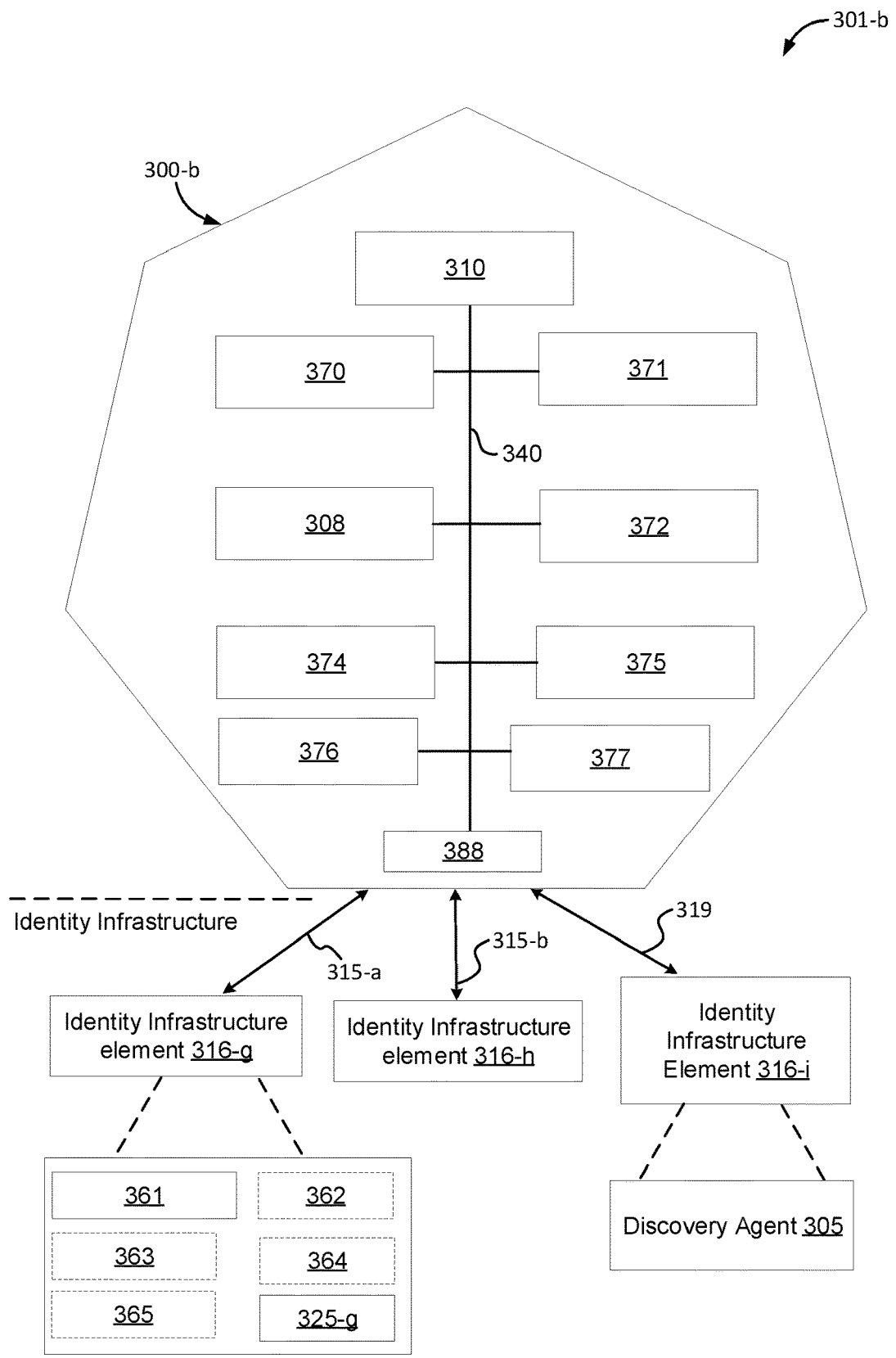
FIG. 3B illustrates a detailed view of the system in FIG. 3A, according to an embodiment of the disclosure.

FIG. 3B illustrates a detailed view of a system 300-b configured for abstraction and enforcement in identity infrastructure 301-b, according to an embodiment of the disclosure. In some cases, the system 300-b may be similar or substantially similar to the system 300-a in FIG. 3A. Further, the identity infrastructure 301-b may be similar or substantially similar to the identity infrastructure 301-a described in relation to FIG. 3A. In some cases, the system 300-b may comprise one or more of: a connecting agent 388, a resource identifying module 308, a dataflow receiving module 310, an identity session request module 370, an identity domain identifying module 371, a configuration detection module 372, an identity session modification module 373, an identity session establishing module 374, a request interception module 375, a rule module 376, which may be configured to perform the functions of one or more of the rule identifying module 134 and rule interpretation module 136 in FIG. 1, an agent using module 377, and a relaying module 378, which may be similar or substantially similar to the respective modules previously described in relation to FIG. 1 and elsewhere. In some cases, the various elements, agents, and/or modules of the system 300-b may be embodied in hardware, software, or a combination thereof. Further, the one or more agents and elements may be in communication via a bus 340.

In some cases, detection and assessment of identity infrastructure elements (e.g., identity infrastructure elements 316-g, 316-h, etc.) may begin by the introduction of workers and/or proxies into the identity infrastructure. In some cases, one or more discovery agents 305 may be installed within the identity infrastructure. For instance, the system 300-b may disperse one or more discovery agents 305 for installing in the identity infrastructure. The discovery agents may gather information about the architecture of the identity infrastructure and communications (e.g., data flows 315) between various users of the identity infrastructure and different apps or subsystems being accessed by said users, to name a few non-limiting examples. The discovery agent 305 may report information about the identity infrastructure to any of the modules of the system 300-b, for instance, the identity domain identifying module 371. Such information may comprise where the various identity infrastructure elements 316 are located in the network (e.g., IP addresses, etc.), how the identity infrastructure elements 316 communicate with each other and/or other devices in the architecture, what types of authentication and authorization the identity infrastructure elements 316 require, and what metadata the systems use, such as authentication or authorization policies, password policy, etc. In some cases, each of the one or more identity infrastructure elements 316 may be associated with one identity domain of the one or more identity domains.

In some examples, each identity infrastructure element may be associated with or store information pertaining to one or more configurations 361. Optionally (shown by the dashed lines), at least a portion of the identity infrastructure elements 316 may store information pertaining to one or more groups 362, roles 363, features 364, and/or identities 365 related to the system's policies. Further, the one or more identity infrastructure elements (or alternatively, the connecting agent 388) may enforce one or more policies before users are allowed to gain access to applications (e.g., protected resources 325-g) through the corresponding identity domain, or alternatively, another identity domain. In some aspects, the identity infrastructure element or the connecting agent 388 may also serve as a gateway to the applications or protected resources.

In some cases, the system 300-b may install 319 at least one discovery agent element (e.g., discovery agent 305) in the identity infrastructure. The identity infrastructure may include the one or more identity domains and identity infrastructure elements, and the at least one discovery agent 305 may be installed on or adjacent to an identity infrastructure element 316-i in the identity infrastructure. In some examples, the identity infrastructure element 316-i may be an Apache Server, an IIS Server, or any other piece of identity infrastructure e.g., on an Apache or Nginx server, or on the control elements of an established identity domain, such as an Oracle Access Manager (OAM) Server. Alternatively, the identity infrastructure element 316-i may be located in the cloud and adapted to communicate and otherwise exchange data with other devices in the identity architecture 301-b via any identity protocol, for example OIDC, SAML, NTLM; or via any other software communication protocol such as HTTP, TCP, etc. In some embodiments, the discovery agent 305 may detect and monitor at least one event associated with the one or more data flows 315, for instance, a request to access a protected resource, such as protected resource 325-g. In some cases, the discovery agent may monitor network or identity traffic (e.g., as described above in relation to FIGS. 1 and 3A), identify the information used to establish an identity session (i.e., based on which access to the protected resource is granted), and convey the same to the system 300-b.

For example, the resource identifying module 308 and/or the identity domain identifying module 371 may be configured to assess, by the at least one discovery agent 305, the identity infrastructure. The assessing may include one or more of detecting and reporting, to the system 300-b, identity data and identity metadata from the identity infrastructure. For instance, the assessing may include detecting and reporting identity data (e.g., identities 365, roles 363, groups 362 related information) and identity metadata (e.g., information pertaining to configurations 361, features 364, policies, such as an authorization policy, network locations, etc.) from identity infrastructure elements 316-g and/or 316-h in the identity infrastructure. By way of a non-limiting example, the identity data may include one or more of a user identity, a user credential, and a user attribute for one or more individual users of the one or more identity domains. Such attributes may comprise name, address, and group associations. By way of non-limiting example, the identity metadata may include one or more of a password rule, an authorization policy, an authentication policy, a trust policy, and network locations for identity domain elements of the one or more identity domains.

In some cases, the system 300-b may facilitate unified identity management across multiple identity systems and/or cloud platforms, which may not only allow consistent identities across clouds, but also policies, fundamentals of access control, and/or authentication. For instance, the system 300-b may enable an administrator for an organization to create unified policies, as well as consolidate rules (e.g., authentication rules, password rules, etc.), roles, groups, configurations, features, etc., across disparate identity systems. In this way, the system 300-b may allow the administrator to manage identities across the different identity systems in a unified manner, which may ease cross-platform compliance, auditing, and/or migration from on-premises systems to the cloud. By way of non-limiting example, managing the one or more data flows through the identity infrastructure 301-b may include managing the one or more data flows pertaining to identity data, where the identity data includes one or more of an authentication request, an authorization request, and an update of user attributes or credentials. In some cases, the discovery and assessment of the identity infrastructure as described herein, may be a precursor to such unified identity management.

In some cases, the system 300-b may be configured to identify one or more protected resources, such as protected resource 325-g, for one or more identity domains of the identity infrastructure, where each of the one or more protected resource may be at least one electronically, logistically, and communicatively coupled to one identity domain (e.g., identity domain associated with identity infrastructure element 316-g) of the one or more identity domains. In some cases, a dataflow 315-a pertaining to first identity data for a first identity domain (e.g., identity infrastructure element 316-g) may be received at the identity infrastructure. The first identity data may correspond to a first user and may comprise user authentication data (e.g., user identity, user credential, user attribute, etc., for the first user). Further, the dataflow 315 may be linked to a first identity session. In this example, the first user may be attempting to access the protected resource 325-g, and a request to access the protected resource 325-g may be received at the resource. The connecting agent 388 may receive, by the protected resource 325-g or the identity infrastructure element 316-g, a request for session information. In some cases, the connecting agent 388 or another module of the system 300-b may process one or more of the information associated with the first identity session and the first identity data and provide access to the protected resource 325-g based in part on the processing. In some examples, the first identity session and the first identity data may be associated with the session information, and the first user may be associated with the first identity domain.

In another example, a user associated with a second identity domain (e.g., identity domain associated with identity infrastructure element 316-h) may also attempt to access the protected resource 325-g. In this example, the protected resource 325-g may not be coupled to the second identity domain. Similar to the example above, a second dataflow 315-b pertaining to the second identity domain may be received at the identity infrastructure 301-b. The second dataflow 315-b may comprise second identity data (i.e., associated with a second user) and may be linked to a second identity session. In some other cases, there may be a representation (e.g., a user profile) of the first user in the second identity domain, however, the second identity domain may have no knowledge of the protected resource 325-g. Likewise, the protected resource 325-g may have no direct integration with the second identity domain. Further, the second dataflow 315-b may pertain to at least a portion of the first identity data for the second identity domain, for instance, if the first user is attempting to access the protected resource via the second identity domain (i.e., if there is an entry, such as a relation or presence, of the first identity data in the second identity domain). In either case, the connecting agent 388 may intercept the request to access the protected resource 325-g before the request to access the resource is received at the protected resource 325-g (or alternatively, the identity infrastructure element 316-g). In cases where the second identity domain only has knowledge or representation of the first user, but not of the first protected resource 325-g, the connecting agent 388 may represent policy similar to what is defined in the first identity domain, which may allow a user associated with the second identity domain to access the first protected resource 325-g previously only protected by the first identity domain. For instance, the connecting agent 388 may interpret one or more access rules for accessing the protected resource 325-g, where the one or more access rules may be associated with the first identity domain (e.g., identity infrastructure element 316-g). Further, the connecting agent 388 may enforce the one or more access rules for accessing the protected resource 325-g by the first or the second user via the second identity domain.

Figure 5:
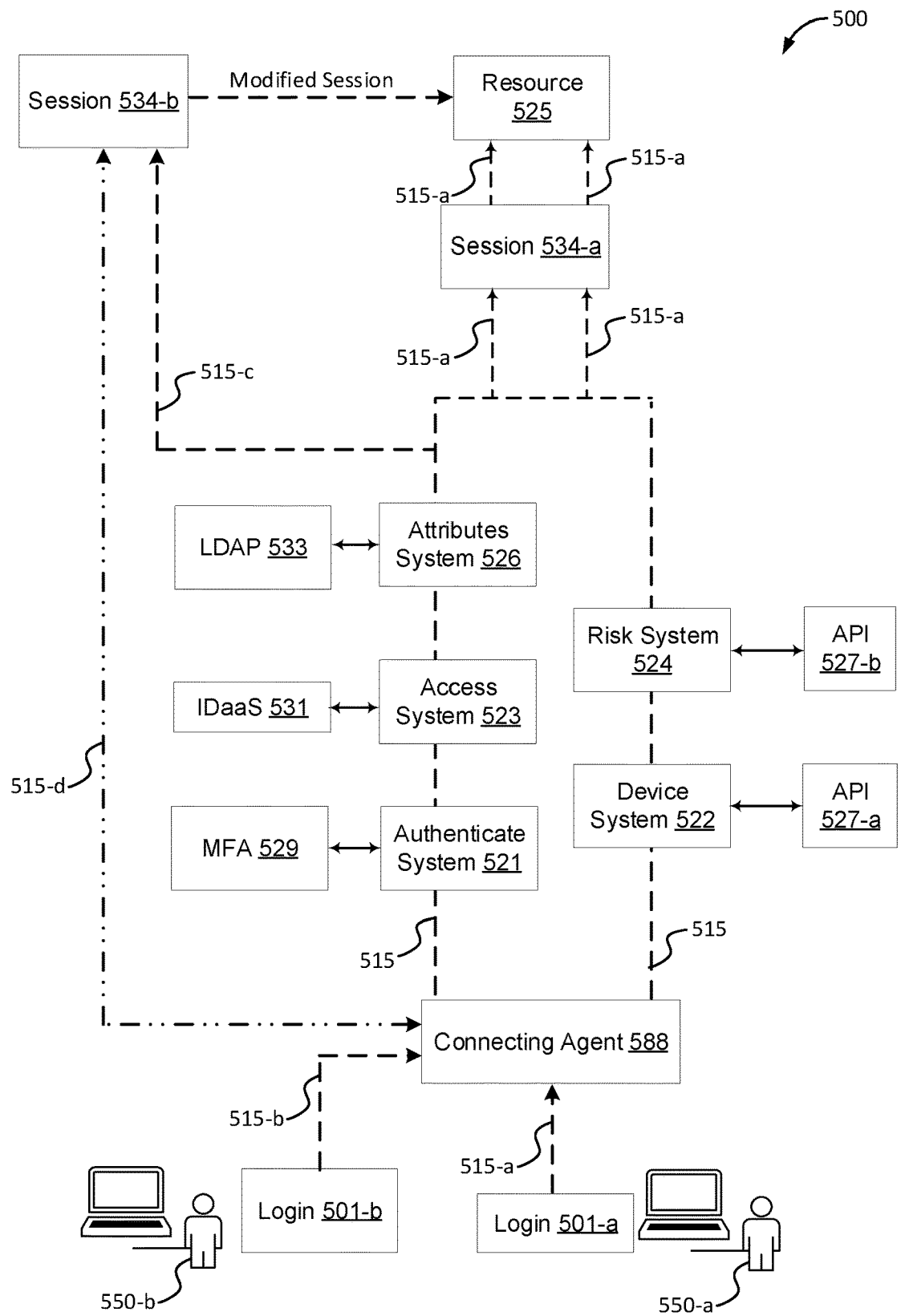
FIG. 5 illustrates a process flow for abstraction and enforcement in an identity infrastructure, in accordance with one or more implementations.
Figure 6A:
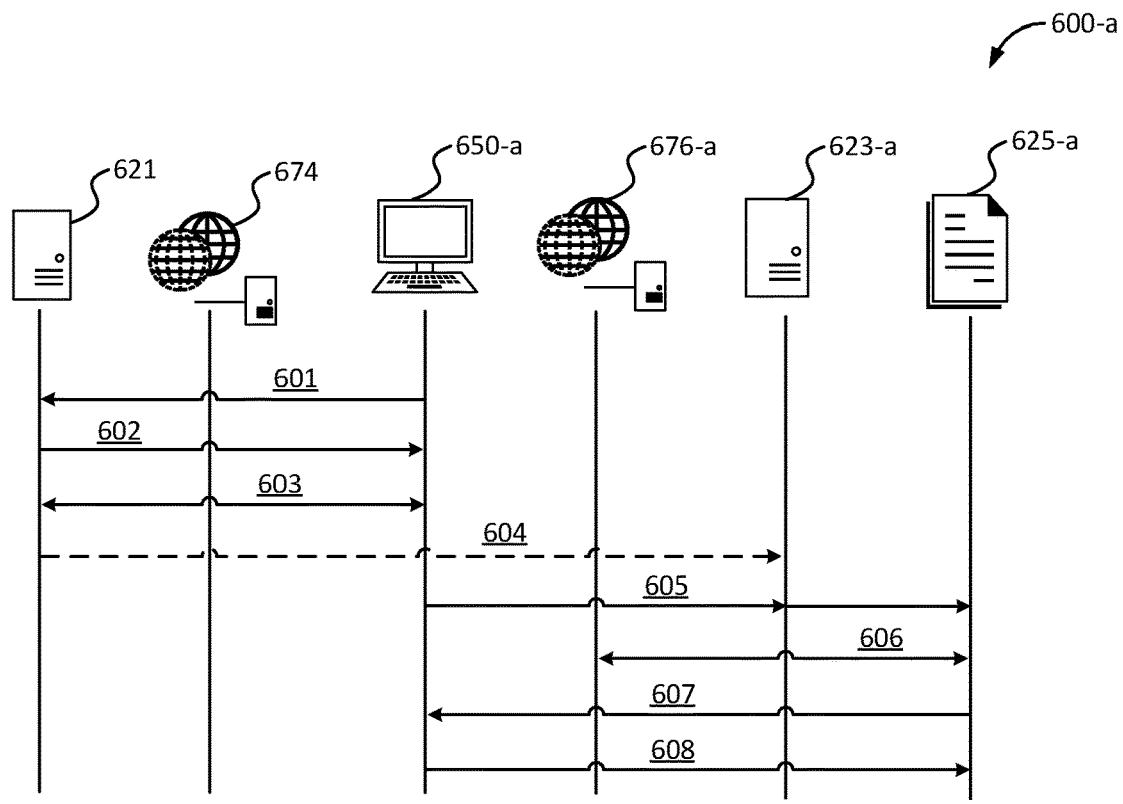
FIGS. 6A and 6B illustrate swim diagrams for abstraction and enforcement in an identity infrastructure, in accordance with one or more implementations.
Figure 6B:
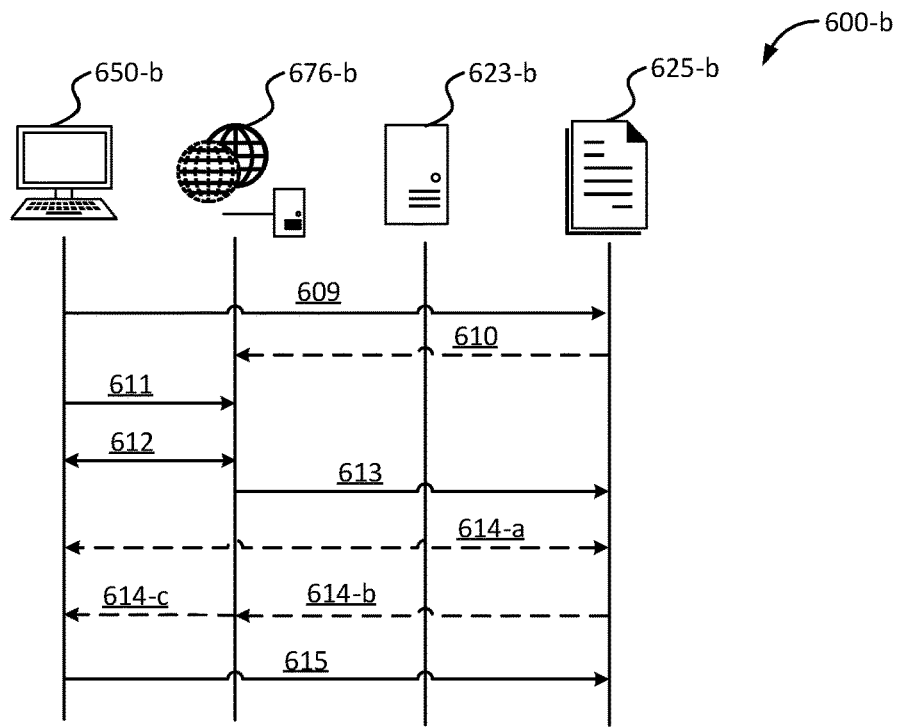

In some cases, the connecting agent 388 may modify the second identity session for the second identity domain based in part on analyzing a compatibility of the second identity session with the protected resource 325-g to create a modified second identity session, further described in relation to FIGS. 5 and 6B. In some embodiments, the modified second identity session may be associated with the second identity domain and may be based at least in part on user authentication data (e.g., first identity data and second identity data). In such cases, the first protected resource (e.g., protected resource 325-g) may evaluate and optionally accept the modified second identity session upon which the user or the second user may be provided access to the resource. In this way, the first user (e.g., associated with both the first and second identity domains) and/or the second user (e.g., only associated with the second identity domain) may be provided access to a protected resource that is associated with the first identity domain (i.e., not coupled to the second identity domain). The following figures provide additional details on the mechanisms by which identity data and/or session information is evaluated and how users are granted access to protected resources.

Figure 4:
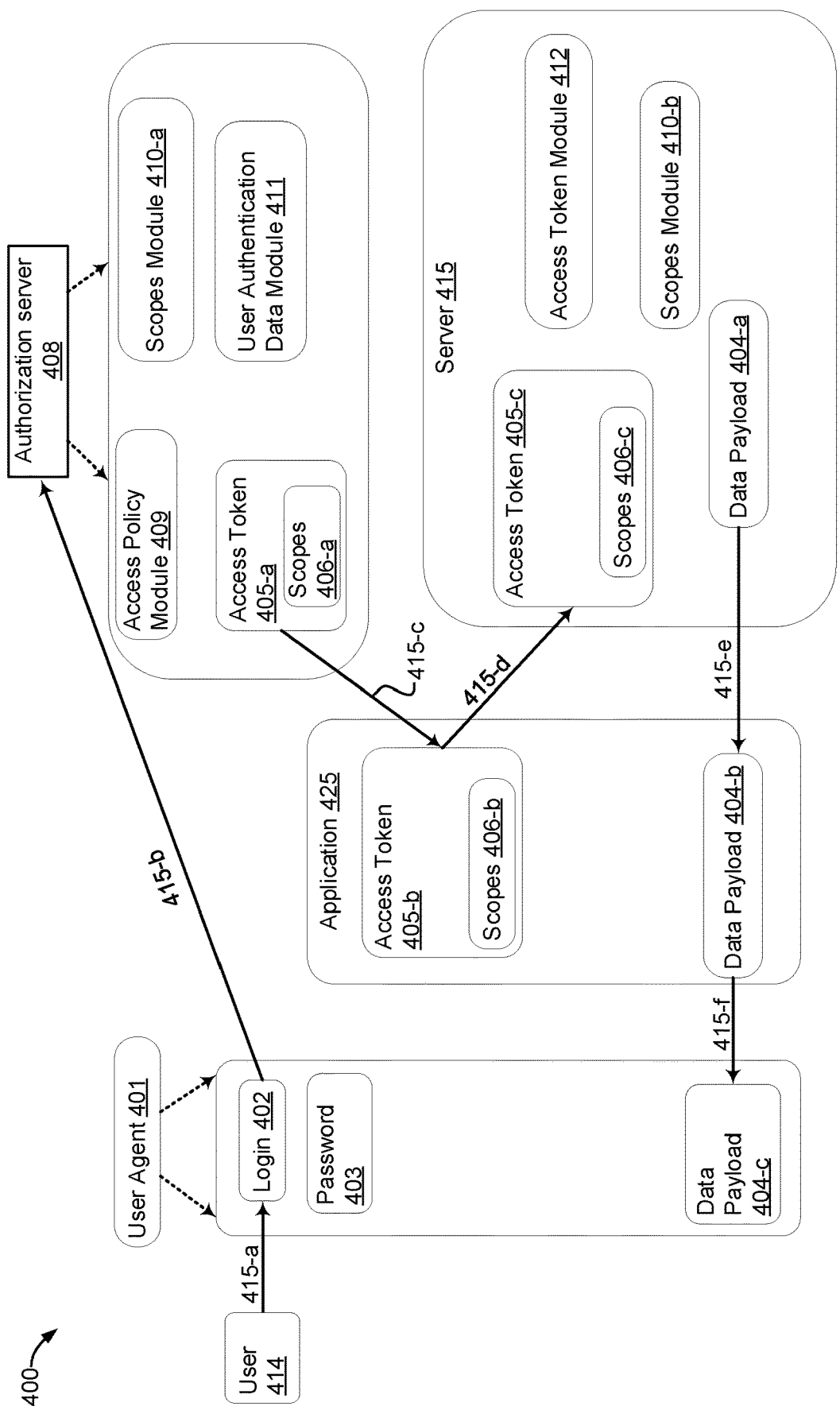
FIG. 4 illustrates an example network design for an authentication system, in accordance with one or more implementations.

FIG. 4 illustrates an example of a network design 400 for an authentication and authorization system, in accordance with one or more implementations. In some embodiments, network design 400 depicts network locations of elements of an identity domain, as well as the various dataflows 415 occurring within an identity infrastructure (e.g., shown as identity infrastructure 300-a in FIG. 3A). The identity infrastructure may be associated with one or more identity domains. As shown, network design 400 may include a user agent 401, an application 425 (e.g., a protected resource), an authorization server 408, and a server 415. In some cases, the server 415 may be a web server configured to be used as one or more of a reverse proxy server, load balancer, mail proxy server, and HTTP cache server. An example of a commercially available web server (e.g., server 415) is NGINX, and an authorization server 408 is an OKTA authorization server. Other types of web servers and authorization servers are contemplated in different embodiments.

As illustrated, user agent 401 may facilitate login 402 by a user 414. User agents may refer to software agents that act on behalf of the user 414, such as a web browser that retrieves, renders and facilitates end user interaction with web content. An email reader is an example of a mail user agent. In some examples, user agents may act as clients in a network protocol used in communications within a client-server distributed computing system. After user agent 401 receives login 402 and password 403 information within a first dataflow 415-a from the user 414, the user agent may forward or relay the received information (e.g., user authentication data) as second dataflow 415-b to the authorization server 408. In some cases, the login and password information may be authenticated (i.e., to verify the user), for instance, by an authentication system or server (e.g., shown as authenticate system 521 in FIG. 5), prior to being relayed to the authorization server 408. It should be noted that authentication refers to who a user is, while authorization refers to what information or resources the user has access to.

The authorization server 408 may comprise one or more of an access policy module 409, a scopes module 410-a, and a user authentication data module 411. The access policy module 409 may validate access policy accuracy based on the received information about the user (e.g., login, password, and any other relevant information), and any applicable information about the requested protected resource. In some cases, validating the access policies may be based in part on interpreting one or more access rules for accessing the protected resource or application 425, for instance, using a connecting agent (not shown in FIG. 4). In some cases, different users may be associated with different roles, varying levels of privileges, authorization or access to different protected resources or apps, etc. For instance, a HR manager may be permitted access to a payroll processing software (i.e., a first protected resource) and a payroll portal software (i.e., a second protected resource), while a non-HR employee may only be permitted access to the payroll portal software (i.e., the second protected resource). Further, the HR manager may be permitted to read and write data (e.g., access payroll information, make changes to payroll information, etc., for one or more users) using the payroll processing software, while the non-HR employee may only be permitted to read payroll data specific to themselves. In some cases, validating access policy accuracy may comprise determining one or more access policies associated with the login and password, for instance, determining authorization or access permissions assigned to the user associated with the login and password, and verifying whether the user is in fact authorized to access the protected resource (or app) they are requesting/attempting to access. For instance, in the example above, the non-HR employee may be denied access to the payroll processing software based on the access policy module 409 validating the access policy accuracy. The scopes module 410-a may also be configured to check one or more of: Scopes OK or NOT OK for the user 414, user authentication data, and multi-factor authentication (MFA) OK or NOT OK. Additionally or alternatively, the user authentication data module 411 may be configured to check one or more of the user authentication data and MFA OK or NOT OK. In some cases, scopes may be used to define the specific actions that are permitted to be performed on behalf of a user, an application, etc. For instance, scopes may be used to define what actions (e.g., read, write, delete, etc.) a user may perform against a protected resource. Additionally or alternatively, scopes may be used to define the access a protected resource or application has to a user's information. When user agent 401 requests permission to access a resource, such as application 425, through an authorization server, it may use a scope parameter to specify what access it needs, and the authorization server 408 uses the scope parameter to respond with the access that was actually granted (e.g., if the granted access is different from what was requested). In some embodiments, the authorization server 408 may generate an access token 405-a comprising one or more scopes 406-a based on the user authentication data and/or scope parameters evaluated by the user authentication data module 411 and/or the scopes module 410-a, respectively. The access token 405-a and scopes 406-a may be relayed within dataflow 415-c to the application 425 and stored as access token 405-b and scopes 406-b. In some examples, access token 405-a and scopes 406-a may be similar or substantially similar to access token 405-b and scopes 406-b. In some examples, the access token may comprise a string of random characters that enable the application 425 to verify incoming requests to access the protected resource. For instance, the access token 405 may be based in part on the username/password credentials received from the user 414 during login 402. In some cases, the access token 405 may also serve as a key that comprises a collection of metadata (e.g., information pertaining to an authorization policy for the user 414). In some embodiments, the access token 405 may be sent to the protected resource, along with the scopes 406 that limit the actions the user 414 is permitted to perform against the protected resource. In some aspects, the access token may be similar to the identity session information that may be contained with a cookie, header, and/or authentication token. However, the access token may be more specific to the process of authorization, and may be used to communicate, to the protected resource, the permissions a user may have to perform actions after a successful authentication. In some examples, the authorization server 408 may request a connecting agent installed on the server 415 to verify or process the identity session based at least in part on one or more of the access token, scopes, user authentication data, and MFA. In some cases, if there is no user authentication data, the connecting agent may redirect the user to an identity domain to authenticate prior to verifying/processing the identity session.

As shown, application 425 may further relay the access token 405-b and scopes 406-b to the web server/reverse proxy server (e.g., server 415) using dataflow 415-d, where they are stored as access token 405-c and scopes 406-c. It should be noted that access token 405-b and access token 405-c, and scopes 406-b and scopes 406-c, may be similar or substantially similar. In some cases, the application 425 may also forward the request for the identity session to the server 415. In some embodiments, the server 415 may evaluate one or more of the access token 405-c (e.g., via an access token module 412) and scopes 406-c (e.g., via a scopes module 410-b). While not shown, in some cases, a connecting agent installed on the server 415 or in communication with the server may be configured to process the identity session information. The processing the identity session may comprise evaluating one or more of the access token 405-c and the scopes 406-c, for instance. Additional data pertaining to the identity session and identity data and/or metadata may also be processed by the connecting agent prior to providing the user 414 access to the application 425.

After processing the identity session information, data payload 404-a may be generated at the web server/proxy server and relayed to application 425 within dataflow 415-e and stored as data payload 404-b. Further, data payload 404-b may be relayed or forwarded to the user agent 401 within dataflow 415-f and optionally stored as data payload 404-c. In some examples, data payloads 404-a, b, c may be similar or substantially similar. In some cases, data payload 404-c may be displayed to the user 414 via the user agent 401, which may comprise a typical screen displayed to that user 414 following a successful login.

FIG. 5 illustrates a process flow 500 for abstraction and enforcement in an identity infrastructure according to an embodiment of the disclosure. In some examples, the abstraction and enforcement may be performed by a connecting agent 588 or any of the other modules described in relation to FIGS. 1-4. In some cases, a discovery agent (e.g., shown as discovery agent 305 in FIG. 3A) may be installed on or near an existing identity infrastructure element, such as an Apache server, for discovery and assessment of the identity infrastructure. In some cases, one or more identity domains and protected resources may also be identified, where each of the one or more protected resources may be at least one electronically, logistically, and communicatively coupled to one identity domain of the one or more identity domains. As used herein, a discovery agent may refer to an autonomous or semi-autonomous software entity that is configured to assess identity information within an identity infrastructure. Identity information may comprise identity data, identity metadata, structure and/or contents of identity sessions, as well as configuration and deployment information for software and hardware entities of an identity domain. In some cases, the discovery agents may intercept and/or proxy networking traffic (e.g., an identity data flow 515) as it is relayed to any of the identity infrastructure elements, such as runtime systems (e.g., authenticate system 521, access system 523, attributes system 526, risk system 524, device system 522) for authentication (e.g., multi-factor authentication (MFA)), authorization, gathering identity attributes, etc.

In this example, a resource 525 is associated with a first identity domain. According to aspects of this disclosure, the connecting agent 588 may be configured to manage at least a portion of the one or more identity domains, including at least the first identity domain. In some cases, the connecting agent may also be configured to process identity data (e.g., user authentication data) and/or information pertaining to an identity session. For instance, the connecting agent may receive a request for session information from the protected resource 525 and process the identity session and the identity data associated with the session information based on which a user may be provided access to the resource. Furthermore, the connecting agent 588 may be configured to manage identity session formats and identity data, as described below. As illustrated, the process flow 500 may begin by a login 501-a from a user 550-a attempting to access resource 525, where the user 550-a may be associated with the first identity domain. Login 501-a may comprise receiving identity data, including one or more of a username, a password, a user attribute, a fingerprint, iris scan, voice input, unique identifier, unique pin, etc., for the first user. Following login, the user input may be relayed to any one of the runtime systems as a first identity data flow 515-a. In some cases, the first identity dataflow 515-a may be linked to a first identity session. In some examples, a request to access the resource 525 may be received within the identity infrastructure, where the request may be received at the resource 525. In some examples, the connecting agent 588 may intercept the request to access the protected resource before the request is received at the resource 525.

In this example, the identity data flow 515-a corresponding to the user 550-a may be sent to one or more identity infrastructure elements, such as an authenticate system 521, an access system 523, an attributes system 526, a device system 522, and/or a risk system 524 associated with the first identity domain, details of which are further described above. In some cases, the identity flow 515-a may be sent to other systems not identified herein. In some cases, the authenticate system 521 may support multi-factor authentication 529, the access system 523 may support identity as a service (IDaaS) 531 for authorization, and the attributes system 526 may be linked or associated with a Lightweight Directory Access Protocol (LDAP) 533 for gathering identity attributes.

In some cases, the process flow 500 may additionally or alternatively comprise receiving, at the identity infrastructure, a second dataflow 515-b. The second dataflow 515-b may pertain to at least a portion of the first identity data for the second identity domain, for instance, if user 550-b is the same as user 550-a and there is an entry (e.g., relation or presence) of the user in the second identity domain. That is, the user 550-a may be associated with both the first and the second identity domain but may be attempting to access the resource 525 via the second identity domain. In some other cases, the second dataflow 515-b may comprise second identity data for the user 550-b (e.g., when users 550-a and 550-b are different users, and when the user 550-b is only associated with the second identity domain). In either case, the second dataflow 515-b may be linked to a second identity session (e.g., session 534-b).

In some examples, the identity infrastructure may also receive a second request from the user 550-b to access the resource 525. In some cases, the second request may be received within the second dataflow 515-b or may be received separate from the second dataflow 515-b. Dataflows 515-c and 515-d depict two example paths based on which the second identity session (or a modified second identity session) may be established before user 550-b is granted access to the resource 525.

Dataflow 515-c depicts an example of a path when the user 550-b is the same as the user 550-a or is associated with both the first and the second identity domains. In such cases, the connecting agent 588 may modify the second identity session 534-b based in part on analyzing a compatibility of the second identity session 534-b with the resource 525. Furthermore, the resource 525 may evaluate or use the modified second identity session before providing the user 550-b access to the protected resource 525. It should be noted that, in this example, after dataflow 515-b is intercepted by the connecting agent it may pass through none or only a portion of the runtime systems (e.g., before branching into dataflow 515-c).

Dataflow 515-d depicts an example of a path when the second user 550-b is only associated with the second identity domain but attempting to access the resource 525 associated with the first identity domain. As shown, the connecting agent 588 may intercept the second dataflow 515-b before the second request is received at the resource 525. In some cases, the connecting agent 588 may be in communication with one or more of the runtime systems, such as access system 523, attributes system 526, etc. Further, the connecting agent 588 may be configured to interpret one or more access rules for accessing the protected resource 525 and enforcing the same, for instance, if the user 550-b is not the same as user 550-a or is only associated with the second identity domain. After interpreting and enforcing the one or more access rules, in some examples, the connecting agent 588 may modify the second identity session 534-b for the second identity domain based in part on analyzing a compatibility of the second identity session 534-b with the resource 525 to create and subsequently establish a modified second identity session. In some cases, the resource 525 may then evaluate or use the modified second identity session before granting access to the user 550-b.

In some embodiments, discovery and assessment of the identity infrastructure may serve as a precursor to the abstraction and enforcement described above. In some circumstances, a discovery agent (not shown) may have detected and assessed the state and structure of the identity infrastructure by analyzing the network traffic or identity data flows 515 as it passes en route to the protected resource 525. For instance, the discovery agent may have detected the configuration and behavior of the identity infrastructure elements, where the configuration may include identity data and identity metadata stored within the identity infrastructure elements. In some cases, assessing the identity infrastructure by the discovery agent may be based at least in part on detecting and assessing one or more identity-centric operations, as described herein with respect to the identity data, metadata, and identity infrastructure elements. In some examples, the one or more identity-centric operations may comprise at least one of enforcing authentication rules based on an authentication performed by the user (e.g., login 501-*a* and authentication by authenticate system 521), granting or denying access to a protected resource (e.g., based on a request to access resource 525), and enforcing authorization rules (e.g., using access system 523).

In the example shown, the device system 522 may be linked or associated with a first custom API 527-*a*, which may be configured to perform device verification, and the risk system 524 may be linked or associated with a second custom API 527-*b*, which may be configured to retrieve a threat or risk score. In some embodiments, the APIs 527-*a* and/or 527-*b* may link the device system 522 and/or risk system 524, respectively, to one or more applications (not shown), where the one or more applications may be third-party applications. In some cases, the one or more third party applications may be executed or hosted on another server (not shown). For instance, the device system 522 may be configured to interact with a third-party device verification application by making a call (e.g., an API call) using API 527-*a*. The third-party device verification application may then process the information received from the device system 522 (e.g., via the API 527-*a*) and relay a response (e.g., Verified or Not verified, 1 or 0, Yes or No, etc.) to the device system 522, based on which the user device from which the login 501 (e.g., login 501-*a*) was received may be verified. In some cases, the device system 522 may receive the response via the API 527-*a*. In some cases, the risk system 524 may also interact with a third-party risk verification application by making an API call using API 527-*b*, where the third-party risk verification application may then relay a response back to the risk system 524 via the API 527-*b*. In some embodiments, the third-party risk and verification applications may be executed or hosted on the same or a different third-party server. Device verification may serve as an added level of security (i.e., in addition to a username and password, for instance) and may be used to verify that the login 501 (e.g., login 501-*a*) is coming from a recognized device (e.g., mobile device, laptop, computer, etc.) associated with an authorized user. Further, device verification may comprise transmitting a verification code over text (SMS), a phone call, an app, etc., to a recognized device associated with the user (e.g., user 550-*a*). The device system 522 may verify the device from which the login was received upon the user inputting the same verification code. In some cases, the threat or risk score may be associated with a perceived or estimated threat level (e.g., for a user's identity), and may be based on one or more factors, including, but not limited to, time of day, day of week, geographic data, and/or IP address. For instance, a higher risk score may be assigned when the login 501 is during non-working hours (e.g., 3 AM) as compared to during working hours (e.g., 11 am). In another example, a lower risk score may be assigned when the login 501 is from a known IP address as opposed to unknown IP address. In yet another example, a higher risk score may be assigned when the login 501 is from a geographic region (e.g., city, state, country, etc.) that the user has never logged in from before.

In some cases, the risk system 524 may be configured to authorize or flag the login 501 based in part on comparing the retrieved risk or threat score to a threshold. In one non-limiting example, the login 501 and access to resource 525 may be denied based on the risk score exceeding the threshold. In another example, the user requesting the login 501 may be prompted to change their password based on receiving a link or code on a registered device. In this case, the user may need to first click the link or input the code received on their registered device (e.g., a smartphone associated with the user) and then proceed to update their password. The user may then restart the login 501 process via the one or more runtime systems. Alternatively, if the risk or threat score is under a threshold, the login 501 may be successful and a session 534, such as first session 534-*a*, may be initiated (e.g., the user device may display a Welcome Screen with one or more links to access different apps or resources, including resource 525).

The discovery agent element may be configured to monitor the identity data flow as it passes through the various identity infrastructure elements or runtime systems and determine the information used to establish an identity session 534 and gain access to the protected resource 525 (i.e., a successful request). In some cases, the discovery agent element may also identify where unsuccessful requests are routed to (e.g., routed to attributes system 526 so that user password can be updated). In some cases, a session may refer to a temporary and interactive information interchange between two or more communicating devices (e.g., a user device associated with login 501 and a server hosting resource 525). Further, an established session (e.g., identity session) may be a prerequisite for performing a connection-oriented communication. In some cases, a session (e.g., modified or non-modified session) may be initiated or established before data is transferred. As described above, session initiation 534 may comprise displaying a successful login screen or welcome screen with one or more links to resources or apps authorized for use by the user, for instance, which may be indicative of a connection between the user device and the server hosting the resource 525.

It should be noted that the identity data flows 515 (e.g., identity dataflow 515-*a*, 515-*b*, 515-*c*) may interact with any of the runtime systems illustrated in FIG. 5, and in any order. In some other cases, the identity data flows 515 may interact with different runtime systems in parallel (e.g., authenticate system 521 and device system 522 simultaneously). In other cases, the identity data flows 515 may interact with the runtime systems in a first branch (e.g., the left branch with authenticate, access, and attributes systems in FIG. 5), followed by the runtime systems in the second branch (i.e., right branch with risk and device systems). Either way, the discovery agent elements may be configured to detect the behavior and configurations of the various identity infrastructure elements and report the same to a centralized server or administrator based on intercepting the one or more identity data flows 515 within the identity infrastructure.

FIGS. 6A and 6B illustrate swim diagrams 600-*a* and 600-*b*, respectively, for abstraction and enforcement in an identity infrastructure. Swim diagrams 600-*a* and 600-*b* may implement one or more aspects of the figures described herein, and may be performed by one or more of an authenticate system 521, an authorization system 623 (also referred to as an access system), a protected resource 625, an optional discovery agent 674, a connecting agent 676, and a user device 650.

Turning now to swim diagram 600-*a*, which may be implemented using one or more identity infrastructure elements, including authentication point 621, authorization point 623-*a*, and protected resource 625-*a*. In some cases, the authorization point 623-*a* (also shown as access system 523 in FIG. 5) may be configured to enforce authorization rules and/or evaluate authorization rules based at least in part on identity session attributes. The protected resource 625-*a* may include applications or apps, or any other type of protected resource (e.g., files, documents, databases, etc.) to which access is restricted based on identity data.

In the example shown, a discovery agent element 674 has been deployed within the identity infrastructure. In some cases, the discovery agent element 674 may be configured to read configuration data from web servers, proxies, application servers, identity systems or identity domains, directories, and/or databases in the identity infrastructure. Additionally or alternatively, the discovery agent element 674 may be configured to read policies and session information from identity system datastores. In some cases, the discovery agent element 674 may be utilized to gather real-time data about how user access to applications or protected resource 625-*a* is routed within the identity infrastructure. In some cases, a client organization may utilize an access management platform, for instance, a SiteMinder Webagent installed on a server, such as an Apache server. Further, the discovery agent 674 may be installed on or near the Apache server, for instance. In some circumstances, the server may also store information for one or more of: policies, configurations, roles, identities, groups, and features, for the identity domain, to name a few non-limiting examples.

In some cases, a user wishing to access an application (e.g., protected resource 625-*a*) via user device 650-*a* may first need to authenticate themselves (i.e., properly identify themselves). As shown, at step 601, the user device 650-*a* may send user authentication data (e.g., user identity, user credential, user attribute information) to authenticate system 621.

At step 602, the authenticate system 621 may authenticate the user based on the user authentication data and send a confirmation message (e.g., a token) and/or information pertaining to an identity session to the user device 650-*a*. At step 603, an identity session may be established between the user associated with the user device 650-*a* and an identity domain. It should be noted that the identity session and the protected resource 625-*a* may be associated with the identity domain.

At step 604 (shown as optional by the dashed lines), the authenticate system 621 may transmit an authentication assertion message to authorization point 623-*a*, where the authentication assertion message may indicate that the user has been authenticated. In some cases, the authenticate system 621 may also transmit the token transmitted to the user device 650-*a*, which may enable the authorization system 623 to match the token(s) received from the user device 650-*a* and the authenticate system 621.

At step 605, the user device 650-*a* may relay the token and/or identity session information received from the authenticate system 621 to the authorization point 623-*a*. In some examples, the user device 650-*a* may also transmit a request to access the protected resource 625-*a*. In some cases, the connecting agent 676-*a* may intercept the request to access the protected resource 625 before it is received at the authorization system 623-*a* or the protected resource 625-*a* and process the identity session information.

At step 606, one or more of the connecting agent 676-*a* and the authorization point 623 may perform authorization assertion with the protected resource 625-*a*. Authorization assertion may comprise evaluating and enforcing the access rules for the user (e.g., is user authorized to access this particular resource). In some cases, the identity session may be accepted by the protected resource 625-*a* based at least in part on evaluating the identity session and the identity data.

At step 607, at least one of the authorization system 623, the connecting agent 676-*a*, and the protected resource 625-*a* may transmit a message indicating that the user has been granted access to the protected resource 625.

At step 608, the user associated with the user device 650-*a* may access the protected resource 625-*a*.

Turning now to swim diagram 600-*b*, which is directed to accessing a protected resource 625-*b* associated with a different identity domain (e.g., a first identity domain) than which an identity session is associated with (e.g., a second identity domain). Swim diagram 600-*b* may be implemented using one or more identity infrastructure elements, including an authentication point (not shown), discovery agent (not shown), authorization point 623-*b*, connecting agent 676-*b*, user device 650-*b*, and protected resource 625-*b*. In this case, the protected resource 625-*b* may be associated with a first identity domain, while a user associated with the user device 650-*b* may be associated with a second identity domain.

At step 609, a request to access the protected resource 625-*b* may be received in the identity infrastructure, where the request may originate at the user device 650-*b*. In some cases, the request may be directed to the protected resource 625-*b* but may be intercepted by the connecting agent 676-*b*. Additionally or alternatively, upon receiving the request, the protected resource 625-*b* may request session information from the connecting agent 676-*b* (optional step 610).

At step 611, a dataflow pertaining to the second identity domain may be received, where the dataflow may comprise identity data for the user and may be linked to an identity session. In some cases, an identity session may be associated with an identity session format, and different identity domains may be associated with different identity session formats. For instance, the protected resource 625-*b* may accept identity sessions in a first identity session format associated with the first identity domain, but not identity sessions in a second identity session format associated with the second identity domain. In some cases, the connecting agent 676-*b* may be configured to manage one or more identity domains, such as the first and the second identity domain, identity session formats associated with the first and second identity domain, and/or identity data.

At step 612, the connecting agent 676-*b* may modify the identity session for the second identity domain based in part on analyzing a compatibility of the identity session with the protected resource 625-*b* to create a modified identity session. Further, the system or the connecting agent may establish the modified identity session.

In some cases, the modified identity session information may be transmitted to one or more of the authorization system 623-*b* and the protected resource 625-*b* (step 613).

At step 614, the protected resource 625-*b* may accept the modified identity session based on evaluating it. For instance, the protected resource 625-*b* may evaluate one or more of the identity data for the user, the modified identity session, and access rules for accessing the protected resource, to name three non-limiting examples. Additional types of information may be evaluated before the modified identity session is accepted, in some embodiments. Steps 614-*a*, and 614-*b* and 614-*c* depict two example scenarios, one where the protected resource 625-*b* accepts the modified identity session and directly transmits an indication of the same to the user device 650-*a* (e.g., step 614-*a*), and another where the protected resource first transmits an indication to the connecting agent 676-*a* that the modified identity session has been accepted (e.g., step 614-*b*) following which the connecting agent relays the indication to the user device 650-*a* (e.g., step 614-*c*).

At step 615, the user may access the protected resource 625-*b* based on the accepting.

It should be noted that the order in which the steps in swim diagrams 600-*a* and 600-*b* are exemplary only, and not intended to be limiting. For instance, in some alternative implementations, the functions noted in swim diagrams 600 may occur out of the order noted in FIGS. 6A and/or 6B. For example, two steps shown in succession may, in fact, be executed substantially concurrently, or the steps may sometimes be executed in the reverse order, depending upon the functionality involved. It will also be noted that each step of the swim diagrams, and combinations of steps in the swim diagrams, can be implemented by special purpose hardware-based systems that perform the specified functions or acts, or combinations of special purpose hardware and computer instructions, as previously described in relation to FIGS. 1-5.

Figure 7:
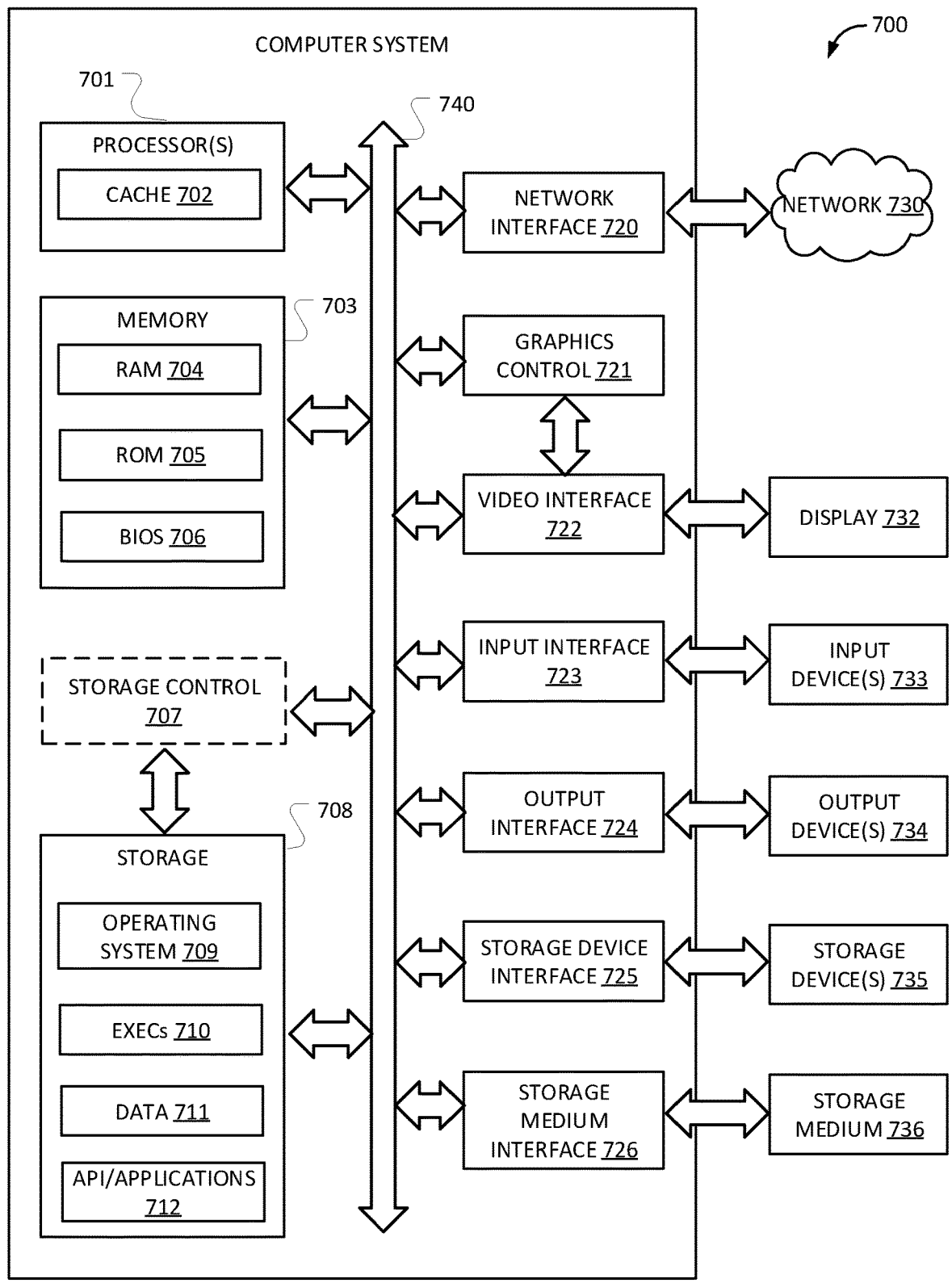
FIG. 7 is a block diagram depicting an exemplary machine that includes a computer system within which a set of instructions can be executed for causing a device to perform or execute any one or more of the aspects and/or methodologies of the present disclosure.

FIG. 7 illustrates a diagrammatic representation of one embodiment of a computer system 700, within which a set of instructions can execute for causing a device to perform or execute any one or more of the aspects and/or methodologies of the present disclosure. The components in FIG. 7 are examples only and do not limit the scope of use or functionality of any hardware, software, firmware, embedded logic component, or a combination of two or more such components implementing particular embodiments of this disclosure. Some or all of the illustrated components can be part of the computer system 700. For instance, the computer system 700 can be a general-purpose computer (e.g., a laptop computer) or an embedded logic device (e.g., an FPGA), to name just two non-limiting examples. In some cases, computer system 700 may implement one or more aspects of FIGS. 1-6.

Moreover, the components may be realized by hardware, firmware, software or a combination thereof. Those of ordinary skill in the art in view of this disclosure will recognize that if implemented in software or firmware, the depicted functional components may be implemented with processor-executable code that is stored in a non-transitory, processor-readable medium such as non-volatile memory. In addition, those of ordinary skill in the art will recognize that hardware such as field programmable gate arrays (FPGAs) may be utilized to implement one or more of the constructs depicted herein.

Computer system 700 includes at least a processor 701 such as a central processing unit (CPU) or a graphics processing unit (GPU) to name two non-limiting examples. Any of the subsystems described throughout this disclosure could embody the processor 701. The computer system 700 may also comprise a memory 703 and a storage 708, both communicating with each other, and with other components, via a bus 740. The bus 740 may also link a display 732, one or more input devices 733 (which may, for example, include a keypad, a keyboard, a mouse, a stylus, etc.), one or more output devices 734, one or more storage devices 735, and various non-transitory, tangible computer-readable storage media 736 with each other and/or with one or more of the processor 701, the memory 703, and the storage 708. All of these elements may interface directly or via one or more interfaces or adaptors to the bus 740. For instance, the various non-transitory, tangible computer-readable storage media 736 can interface with the bus 740 via storage medium interface 726. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 701 (or central processing unit(s) (CPU(s))) optionally contains a cache memory unit 732 for temporary local storage of instructions, data, or computer addresses. Processor(s) 701 are configured to assist in execution of computer-readable instructions stored on at least one non-transitory, tangible computer-readable storage medium. Computer system 700 may provide functionality as a result of the processor(s) 701 executing software embodied in one or more non-transitory, tangible computer-readable storage media, such as memory 703, storage 708, storage devices 735, and/or storage medium 736 (e.g., read only memory (ROM)). Memory 703 may read the software from one or more other non-transitory, tangible computer-readable storage media (such as mass storage device(s) 735, 736) or from one or more other sources through a suitable interface, such as network interface 720. Any of the subsystems herein disclosed could include a network interface such as the network interface 720. The software may cause processor(s) 701 to carry out one or more processes or one or more steps of one or more processes described or illustrated herein. Carrying out such processes or steps may include defining data structures stored in memory 703 and modifying the data structures as directed by the software. In some embodiments, an FPGA can store instructions for carrying out functionality as described in this disclosure. In other embodiments, firmware includes instructions for carrying out functionality as described in this disclosure.

The memory 703 may include various components (e.g., non-transitory, tangible computer-readable storage media) including, but not limited to, a random-access memory component (e.g., RAM 704) (e.g., a static RAM "SRAM", a dynamic RAM "DRAM, etc.), a read-only component (e.g., ROM 705), and any combinations thereof. ROM 705 may act to communicate data and instructions unidirectionally to processor(s) 701, and RAM 704 may act to communicate data and instructions bidirectionally with processor(s) 701. ROM 705 and RAM 704 may include any suitable non-transitory, tangible computer-readable storage media. In some instances, ROM 705 and RAM 704 include non-transitory, tangible computer-readable storage media for carrying out a method. In one example, a basic input/output system 706 (BIOS), including basic routines that help to transfer information between elements within computer system 700, such as during start-up, may be stored in the memory 703.

Fixed storage 708 is connected bi-directionally to processor(s) 701, optionally through storage control unit 707. Fixed storage 708 provides additional data storage capacity and may also include any suitable non-transitory, tangible computer-readable media described herein. Storage 708 may be used to store operating system 709, EXECs 710 (executables), data 711, API applications 712 (application programs), and the like. Often, although not always, storage 708 is a secondary storage medium (such as a hard disk) that is slower than primary storage (e.g., memory 703). Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with computer system 700 (e.g., via an external port connector (not shown)) via a storage device interface 725. Particularly, storage device(s) 735 and an associated machine-readable medium may provide nonvolatile and/or volatile storage of machine-readable instructions, data structures, program modules, and/or other data for the computer system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 700 may also include an input device 733. In one example, a user of computer system 700 may enter commands and/or other information into computer system 700 via input device(s) 733. Examples of an input device(s) 733 include, but are not limited to, an alphanumeric input device (e.g., a keyboard), a pointing device (e.g., a mouse or touchpad), a touchpad, a touch screen and/or a stylus in combination with a touch screen, a joystick, a gamepad, an audio input device (e.g., a microphone, a voice response system, etc.), an optical scanner, a video or still image capture device (e.g., a camera), and any combinations thereof. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when computer system 700 is connected to network 730, computer system 700 may communicate with other devices, such as mobile devices and enterprise systems, connected to network 730. Communications to and from computer system 700 may be sent through network interface 720. For example, network interface 720 may receive incoming communications (such as requests or responses from other devices) in the form of one or more packets (such as Internet Protocol (IP) packets) from network 730, and computer system 700 may store the incoming communications in memory 703 for processing. Computer system 700 may similarly store outgoing communications (such as requests or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 or network segment 730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 730, may employ a wired and/or a wireless mode of communication. In general, any network topology may be used.

Information and data can be displayed through a display 732. Examples of a display 732 include, but are not limited to, a liquid crystal display (LCD), an organic liquid crystal display (OLED), a cathode ray tube (CRT), a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721.

In addition to a display 732, computer system 700 may include one or more other peripheral output devices 734 including, but not limited to, an audio speaker, a printer, a check or receipt printer, and any combinations thereof. Such peripheral output devices may be connected to the bus 740 via an output interface 724. Examples of an output interface 724 include, but are not limited to, a serial port, a parallel connection, a USB port, a FIREWIRE port, a THUNDERBOLT port, and any combinations thereof. In some examples, the peripheral output devices may be used to generate reports for the entity, such as, but not limited to, financial reports, feedback reports, inventory reports, etc.

In addition, or as an alternative, computer system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a non-transitory, tangible computer-readable medium may encompass a circuit (such as an integrated circuit (IC)) storing software for execution, a circuit embodying logic for execution, or both, where appropriate. The present disclosure encompasses any suitable combination of hardware, software, or both.

Those of skill in the art will understand that information and signals may be represented using any of a variety of different technologies and techniques. Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, a software module implemented as digital logic devices, or in a combination of these. A software module may reside in RAM memory, flash memory, ROM memory, EPROM memory, EEPROM memory, registers, hard disk, a removable disk, a CD-ROM, or any other form of non-transitory, tangible computer-readable storage medium known in the art. An exemplary non-transitory, tangible computer-readable storage medium is coupled to the processor such that the processor can read information from, and write information to, the non-transitory, tangible computer-readable storage medium. In the alternative, the non-transitory, tangible computer-readable storage medium may be integral to the processor. The processor and the non-transitory, tangible computer-readable storage medium may reside in an ASIC. The ASIC may reside in a user terminal. In the alternative, the processor and the non-transitory, tangible computer-readable storage medium may reside as discrete components in a user terminal. In some embodiments, a software module may be implemented as digital logic components such as those in an FPGA once programmed with the software module.

It is contemplated that one or more of the components or subcomponents described in relation to the computer system 700 shown in FIG. 7 such as, but not limited to, the network 730, processor 701, memory, 703, etc., may comprise a cloud computing system. In one such system, front-end systems such as input devices 733 may provide information to back-end platforms such as servers (e.g. computer systems 700) and storage (e.g., memory 703). Software (i.e., middleware) may enable interaction between the front-end and back-end systems, with the back-end system providing services and online network storage to multiple front-end clients. For example, a software-as-a-service (SAAS) model may implement such a cloud-computing system. In such a system, users may operate software located on back-end servers through the use of a front-end software application such as, but not limited to, a web browser.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for abstraction and enforcement of identity sessions in an identity infrastructure, the system comprising: one or more hardware processors configured by machine-readable instructions to:
   identify one or more protected resources for one or more identity domains of the identity infrastructure, wherein each of the one or more protected resources is at least one of electronically, logistically, and communicatively coupled to one identity domain of the one or more identity domains;
   receive, at the identity infrastructure, a dataflow pertaining to first identity data for a first identity domain, wherein the first identity data corresponds to a first user and comprises one or more of a user identity, a user credential, and a user attribute, and wherein the dataflow is linked to a first identity session;
   request the first identity session based at least in part on the first identity data, wherein the first identity session is associated with the first identity domain;
   receive a request to access a first protected resource of the one or more protected resources, wherein the request to access the first protected resource is received at the first protected resource;
   receive, by a connecting agent of the identity infrastructure, a request for session information from the first protected resource;
   process one or more of the first identity session and the first identity data by the connecting agent, wherein the first identity session and the first identity data are associated with the session information;
   accept the first identity session by the first protected resource, wherein the accepting comprises evaluating the first identity session and the first identity data; and
   provide, to the first user, access to the first protected resource, wherein the first user is associated with the first identity domain, and wherein the providing access to the first protected resource is based at least in part on the processing.

2. The system of claim 1, wherein the first protected resource is at least one of electronically, logistically, and communicatively coupled to the first identity domain.

3. The system of claim 2, wherein the one or more hardware processors are further configured by machine-readable instructions to:
   identify a second identity domain in the identity infrastructure;
   receive, at the identity infrastructure, a second dataflow pertaining to at least a portion of the first identity data for the second identity domain, wherein the at least the portion of the first identity data corresponds to the first user and the second dataflow is linked to a second identity session;
   receive a second request to access the first protected resource, wherein the first protected resource is not coupled to the second identity domain; and
   modify the second identity session for the second identity domain based at least in part on analyzing a compatibility of the second identity session with the first protected resource to create a modified second identity session.

4. The system of claim 3, wherein the one or more hardware processors are further configured by machine-readable instructions to:
   establish the modified second identity session based at least in part on the first identity data, wherein the modified second identity session is associated with the second identity domain;
   accept the modified second identity session by the first protected resource, wherein the accepting comprises evaluating the modified second identity session; and
   provide, to the first user, access to the first protected resource, wherein the first user is further associated with the second identity domain.

5. The system of claim 1, wherein the one or more hardware processors are further configured by machine-readable instructions to:
   intercept, by the connecting agent of the identity infrastructure, the request to access the first protected resource before receiving the request to access a first protected resource.

6. The system of claim 5, wherein the connecting agent comprises one or more connecting agents; and
   wherein the one or more hardware processors are further configured by machine-readable instructions to use the one or more connecting agents to manage at least a portion of the one or more identity domains, including at least the first identity domain, and manage a plurality of identity session formats and identity data, including at least a first identity session format associated with the first identity session, and the first identity data.

7. The system of claim 1, wherein the first protected resource is at least one of electronically, logistically, and communicatively coupled to the first identity domain, and wherein the one or more hardware processors are further configured by machine-readable instructions to:
   identify a second identity domain in the identity infrastructure;
   receive, at the identity infrastructure, a second dataflow pertaining to the second identity domain, wherein the second dataflow comprises second identity data, and wherein the second dataflow is linked to a second identity session;
   receive a second request to access the first protected resource, wherein the first protected resource is not coupled to the second identity domain;
   interpret, by the connecting agent, one or more access rules for accessing the first protected resource, wherein the one or more access rules are associated with the first identity domain;
   enforce, by the connecting agent, the one or more access rules for accessing the first protected resource based at least in part on the interpreting; and
   provide access to the first protected resource to a second user, wherein the second user is associated with the second identity domain and the second identity data.

8. The system of claim 1, wherein the first protected resource is at least one of electronically, logistically, and communicatively coupled to the first identity domain, and wherein the one or more hardware processors are further configured by machine-readable instructions to:
   identify a second identity domain in the identity infrastructure;
   receive, at the identity infrastructure, a second dataflow pertaining to the second identity domain, wherein the second dataflow comprises second identity data, and wherein the second dataflow is linked to a second identity session;
   receive a second request to access the first protected resource, wherein the first protected resource is not coupled to the second identity domain;
   modify the second identity session for the second identity domain based at least in part on analyzing a compatibility of the second identity session with the first protected resource to create a modified second identity session;
   establish the modified second identity session associated with the second identity domain;
   accept the modified second identity session by the first protected resource, wherein the accepting comprises evaluating or using the modified second identity session; and
   provide access to the first protected resource to a second user, wherein the second user is associated with the second identity domain and the second identity data.

9. A method for abstraction and enforcement of protected resources in an identity infrastructure, comprising:
   identifying one or more protected resources for one or more identity domains of the identity infrastructure, wherein each of the one or more protected resources is at least one of electronically, logistically, and communicatively coupled to one identity domain of the one or more identity domains;
   receiving, at the identity infrastructure, a dataflow pertaining to first identity data for a first identity domain, wherein the first identity data corresponds to a first user and comprises one or more of a user identity, a user credential, and a user attribute, and wherein the dataflow is linked to a first identity session;
   requesting the first identity session based at least in part on the first identity data, wherein the first identity session is associated with the first identity domain;
   receiving a request to access a first protected resource of the one or more protected resources, wherein the request to access the first protected resource is received at the first protected resource;
   receiving, by a connecting agent of the identity infrastructure, a request for session information from the first protected resource;
   processing one or more of the first identity session and the first identity data by the connecting agent, wherein the first identity session and the first identity data are associated with the session information;
   accepting the first identity session by the first protected resource, wherein the accepting comprises evaluating the first identity session and the first identity data; and
   providing access to the first protected resource to the first user, wherein the first user is associated with the first identity domain, and wherein the providing access to the first protected resource is based at least in part on the processing.

10. The method of claim 9, wherein the first protected resource is at least one of electronically, logistically, and communicatively coupled to the first identity domain.

11. The method of claim 10, further comprising:
   identifying a second identity domain in the identity infrastructure;
   receiving, at the identity infrastructure, a second dataflow pertaining to at least a portion of the first identity data for the second identity domain, wherein the at least the portion of the first identity data corresponds to the first user and the second dataflow is linked to a second identity session;
   receiving a second request to access the first protected resource, wherein the first protected resource is not coupled to the second identity domain; and
   modifying the second identity session for the second identity domain based at least in part on analyzing a compatibility of the second identity session with the first protected resource to create a modified second identity session.

12. The method of claim 11, further comprising:
establishing the modified second identity session based at least in part on the first identity data, wherein the modified second identity session is associated with the second identity domain;
accepting the modified second identity session by the first protected resource, wherein the accepting comprises evaluating the modified second identity session; and
providing access to the first protected resource to the first user, wherein the first user is further associated with the second identity domain.

13. The method of claim 9, further comprising:
intercepting, by the connecting agent of the identity infrastructure, the request to access the first protected resource before receiving the request to access a first protected resource.

14. The method of claim 13, wherein the connecting agent comprises one or more connecting agents, the method further comprising:
using the one or more connecting agents to manage at least a portion of the one or more identity domains, including at least the first identity domain, and manage a plurality of identity session formats and identity data, including at least a first identity session format associated with the first identity session, and the first identity data.

15. The method of claim 9, wherein the first protected resource is at least one of electronically, logistically, and communicatively coupled to the first identity domain, the method further comprising:
identifying a second identity domain in the identity infrastructure;
receiving, at the identity infrastructure, a second dataflow pertaining to the second identity domain, wherein the second dataflow comprises second identity data, and wherein the second dataflow is linked to a second identity session;
receiving a second request to access the first protected resource, wherein the first protected resource is not coupled to the second identity domain;
interpreting, by the connecting agent, one or more access rules for accessing the first protected resource, wherein the one or more access rules are associated with the first identity domain;
enforcing, by the connecting agent, the one or more access rules for accessing the first protected resource based at least in part on the interpreting; and
providing access to the first protected resource to a second user, wherein the second user is associated with the second identity domain.

16. The method of claim 9, wherein the first protected resource is at least one of electronically, logistically, and communicatively coupled to the first identity domain, the method further comprising:
identifying a second identity domain in the identity infrastructure;
receiving, at the identity infrastructure, a second dataflow pertaining to the second identity domain, wherein the second dataflow comprises second identity data, and wherein the second dataflow is linked to a second identity session;
receiving a second request to access the first protected resource, wherein the first protected resource is not coupled to the second identity domain;
modifying the second identity session for the second identity domain based at least in part on analyzing a compatibility of the second identity session with the first protected resource to create a modified second identity session;
establishing the modified second identity session associated with the second identity domain;
accepting the modified second identity session by the first protected resource, wherein the accepting comprises evaluating the modified second identity session; and
providing access to the first protected resource to a second user, wherein the second user is associated with the second identity domain and the second identity data.

17. A non-transient computer-readable storage medium having instructions embodied thereon, the instructions being executable by one or more processors to perform a method for abstraction and enforcement of protected resources in an identity infrastructure, the method comprising:
identifying one or more protected resources for one or more identity domains of an identity infrastructure, wherein each of the one or more protected resources is at least one of electronically and communicatively coupled to one identity domain of the one or more identity domains;
receiving, at the identity infrastructure, a dataflow pertaining to first identity data for a first identity domain, wherein the first identity data corresponds to a first user and comprises one or more of a user identity, a user credential, and a user attribute, and wherein the dataflow is linked to a first identity session;
requesting the first identity session based at least in part on the first identity data, wherein the first identity session is associated with the first identity domain;
receiving a request to access a first protected resource of the one or more protected resources, wherein the request to access the first protected resource is received at the first protected resource;
accepting the first identity session by the first protected resource, wherein the accepting comprises evaluating the first identity session and the first identity data;
receiving, by a connecting agent of the identity infrastructure, a request for session information from the first protected resource;
processing one or more of the first identity session and the first identity data by the connecting agent, wherein the first identity session and the first identity data are associated with the session information; and
providing access to the first protected resource to the first user, wherein the first user is associated with the first identity domain.

18. The computer-readable storage medium of claim 17, wherein the first protected resource is at least one of electronically, logistically, and communicatively coupled to the first identity domain.

* * * * *